US012688646B2

(12) United States Patent　　(10) Patent No.:　US 12,688,646 B2

Miyayashiki　　(45) Date of Patent:　Jul. 21, 2026

(54) MEASUREMENT METHOD, MEASUREMENT DEVICE, AND RECORDING MEDIUM

(71) Applicant: Evident Corporation, Nagano (JP)

(72) Inventor: Hidehiro Miyayashiki, Akishima (JP)

(73) Assignee: Evident Corporation, Nagano (JP)

( * ) Notice: Subject to any disclaimer, the term of this patent is extended or adjusted under 35 U.S.C. 154(b) by 674 days.

(21) Appl. No.: 17/487,791

(22) Filed: Sep. 28, 2021

(65) Prior Publication Data

US 2022/0020208 A1　　Jan. 20, 2022

Related U.S. Application Data

(63) Continuation of application No. PCT/JP2020/010021, filed on Mar. 9, 2020.

(51) Int. Cl.
　　　*G06T 7/10*　　　(2017.01)
　　　*G06T 17/00*　　(2006.01)
(52) U.S. Cl.
　　　CPC .................................... *G06T 17/00* (2013.01)
(58) Field of Classification Search
　　　None
　　　See application file for complete search history.

(56) References Cited

U.S. PATENT DOCUMENTS

2008/0088621 A1* 4/2008 Grimaud ................. G06T 19/00
　　　　　　　　　　　　　　　　　　　　　345/421
2013/0051658 A1* 2/2013 Hwang .................. G06V 20/64
　　　　　　　　　　　　　　　　　　　　　382/154

2015/0117729 A1* 4/2015 Kim ...................... G06T 7/0012
　　　　　　　　　　　　　　　　　　　　　382/128
2017/0220230 A1* 8/2017 Price ........................ G06T 7/215
2017/0337705 A1* 11/2017 Bendall .................. G01B 11/24
2017/0370901 A1* 12/2017 Ichitani ..................... G06T 7/11
2018/0204388 A1* 7/2018 Tanaka ................... G06T 19/20
2019/0022863 A1* 1/2019 Kundu ................... G06T 7/187
2021/0150726 A1* 5/2021 Kao ........................ G06T 7/168
2021/0358128 A1* 11/2021 Behrooz ................ G06T 7/155

FOREIGN PATENT DOCUMENTS

| JP | H10-314104 A | 12/1998 |
|---|---|---|
| JP | 2010-127964 A | 6/2010 |
| JP | 2018-521370 A | 8/2018 |
| JP | 2020-034442 A | 3/2020 |
| WO | 2016/149189 A1 | 9/2016 |

OTHER PUBLICATIONS

International Search Report dated Jun. 23, 2020 received in PCT/ JP2020/010021.

* cited by examiner

*Primary Examiner* — Sean M Conner

(74) *Attorney, Agent, or Firm* — K&L Gates LLP

(57) ABSTRACT

A measurement method includes a generation step, a region detection step, an image display step, a point input step, and a measurement step. Three-dimensional image data including three-dimensional coordinates of two or more points on a subject are generated in the generation step. Two or more feature regions on the subject are detected on the basis of the three-dimensional image data in the region detection step. An image of the two or more feature regions is displayed on a display in the image display step. A point on the subject is accepted through an input device in the point input step. A size of the subject is measured on the basis of three-dimensional coordinates of two or more points on the subject.

15 Claims, 22 Drawing Sheets

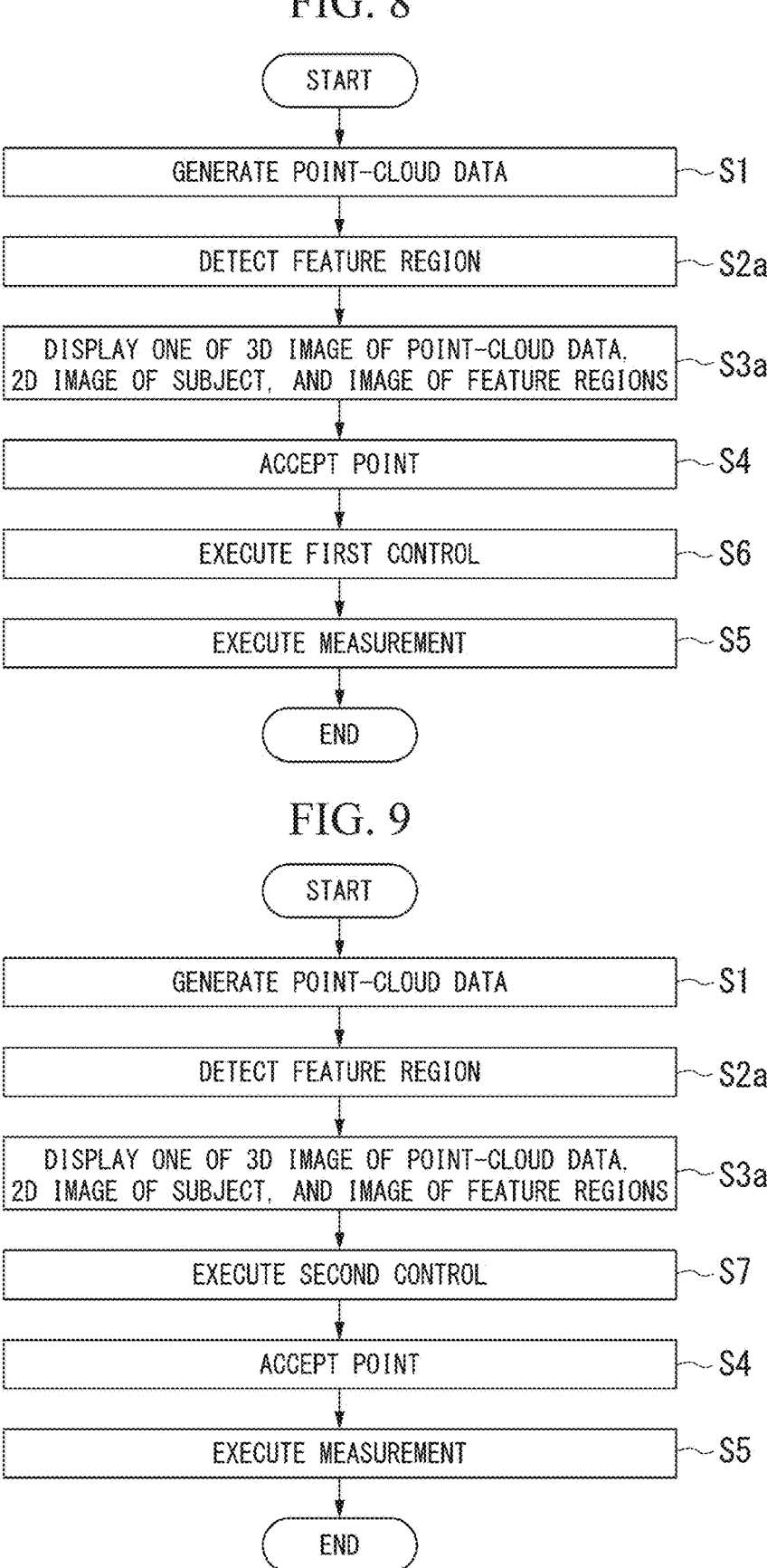

FIG. 8

START

GENERATE POINT-CLOUD DATA — S1

DETECT FEATURE REGION — S2a

DISPLAY ONE OF 3D IMAGE OF POINT-CLOUD DATA,
2D IMAGE OF SUBJECT, AND IMAGE OF FEATURE REGIONS — S3a

ACCEPT POINT — S4

EXECUTE FIRST CONTROL — S6

EXECUTE MEASUREMENT — S5

END

FIG. 9

START

GENERATE POINT-CLOUD DATA — S1

DETECT FEATURE REGION — S2a

DISPLAY ONE OF 3D IMAGE OF POINT-CLOUD DATA,
2D IMAGE OF SUBJECT, AND IMAGE OF FEATURE REGIONS — S3a

EXECUTE SECOND CONTROL — S7

ACCEPT POINT — S4

EXECUTE MEASUREMENT — S5

END

START

S101
GENERATE POINT-CLOUD DATA

S102
EXTRACT FEATURE OF 3D SHAPE

S103
DIVIDE 3D SHAPE INTO FEATURE REGIONS

S104
DISPLAY 2D IMAGE OF SUBJECT
AND IMAGE OF FEATURE REGIONS

S105
DISPLAY CURSOR

S106
SELECT FEATURE REGION

S107
CALCULATE NEW POSITION OF CURSOR

S108
UPDATE CURSOR

S109
ACCEPT POINT

S110
HAVE
NECESSARY NUMBER OF
POINTS BEEN
ACCEPTED?

NO

YES

S111
EXECUTE MEASUREMENT

END

MEASUREMENT METHOD, MEASUREMENT DEVICE, AND RECORDING MEDIUM

The present application is a continuation application based on International Patent Application No. PCT/JP2020/010021 filed on Mar. 9, 2020, the content of which is incorporated herein by reference.

BACKGROUND OF THE INVENTION

Field of the Invention

The present invention relates to a measurement method, a measurement device, and a recording medium.

Description of Related Art

Industrial endoscope devices have been used for observation and inspection of internal damage, corrosion, and the like of boilers, pipes, aircraft engines, and the like. In such an endoscope device, multiple types of optical adapters for observing and inspecting various objects to be observed are prepared. Optical adapters are attached to the distal ends of endoscopes and are exchangeable. In an inspection using such an endoscope device, there is a desire to quantitatively measure the size of a defect, damage, or the like of a subject. To meet such a desire, there is an endoscope device provided with a three-dimensional measurement function.

For example, an endoscope device has a function of measuring geometric sizes of a subject on the basis of information of a point designated on an image by a user. For example, in a distance-between-two-points measurement, the three-dimensional distance between two measurement points designated by a user is measured. In a line-based measurement, a reference line is set on the basis of two reference points designated by a user, and the three-dimensional distance between a measurement point designated by a user and the reference line is measured. In a plane-based measurement, a reference plane is set on the basis of three or more reference points designated by a user, and the three-dimensional distance between a measurement point designated by a user and the reference plane is measured.

A user designates a point on an image displayed on a display. The accuracy of three-dimensional measurement depends on the position of a point designated by a user. For example, there is a case in which two objects overlap each other and it is difficult to recognize the border between the two objects. Even when a user determines that a correct point has been designated, the designated position may be actually on a different object than that on which the point exists. Since an incorrect point is designated, an endoscope device is unable to acquire a correct measurement result.

Japanese Unexamined Patent Application, First Publication No. 2010-127964 discloses a technique used when a user moves a cursor to a suitable position for measurement in a two-dimensional image. In this technique, movement of a cursor is controlled on the basis of the number of features of an image. In a first example, a cursor moves to a position at which the number of features of an image is the greatest. In a second example, the moving speed of a cursor changes on the basis of the number of features of an image. In a third example, the moving direction of a cursor changes on the basis of the number of features of an image.

SUMMARY OF THE INVENTION

According to a first aspect of the present invention, a measurement method executed by a processor includes a generation step, a region detection step, an image display step, a point input step, and a measurement step. In the generation step, three-dimensional coordinates of two or more points on a subject are calculated on the basis of a two-dimensional image of the subject and three-dimensional image data including the three-dimensional coordinates of the two or more points are generated. In the region detection step, two or more feature regions on the subject are detected on the basis of the three-dimensional image data. The three-dimensional shape of the subject has a common feature in each of the two or more feature regions. In the image display step, an image of the two or more feature regions is displayed on a display so that the two or more feature regions are visually distinguished from each other. In the point input step, a point on the subject is accepted through an input device after the image display step is executed and point information indicating the accepted point is generated. In the measurement step, the size of the subject is measured on the basis of three-dimensional coordinates of two or more points on the subject including the point indicated by the point information.

According to a second aspect of the present invention, in the first aspect, the measurement method may further include a region selection step and an information control step. In the region selection step, one of the two or more feature regions may be selected as a selected region. In the information control step, the point information may be validated only when a point in the selected region is accepted in the point input step. In the measurement step, the size of the subject may be measured on the basis of the three-dimensional coordinates of the two or more points including the point indicated by the valid point information.

According to a third aspect of the present invention, in the first aspect, one of an image of the three-dimensional image data and the two-dimensional image may be displayed on the display in the image display step. The measurement method may further include a region selection step, a mark display step, and a position calculation step. In the region selection step, one of the two or more feature regions may be selected as a selected region. In the mark display step, a mark may be displayed on one of the image of the three-dimensional image data and the two-dimensional image. In the position calculation step, the position at which the mark is displayed may be calculated on the basis of information accepted through the input device. The position at which the mark may be displayed is restricted to a position in a region corresponding to the selected region. The point corresponding to the position of the mark may be accepted in the point input step.

According to a fourth aspect of the present invention, in the first aspect, the measurement method may further include a region selection step, a mark display step, and a position calculation step. In the region selection step, one of the two or more feature regions may be selected as a selected region. In the mark display step, a mark may be displayed on the image of the two or more feature regions. In the position calculation step, the position at which the mark is displayed may be calculated on the basis of information accepted through the input device. The position at which the mark is displayed may be restricted to a position in the selected region. The point corresponding to the position of the mark may be accepted in the point input step.

According to a fifth aspect of the present invention, in the first aspect, the measurement method may further include a region selection step and an information control step. In the region selection step, one of the two or more feature regions may be selected as a selected region. In the information control step, the accepted point information may be invalidated when a point outside the selected region is accepted in the point input step and new point information indicating a point in the selected region may be generated. In the measurement step, the size of the subject may be measured on the basis of the three-dimensional coordinates of the two or more points indicated by the point information other than the invalid point information.

According to a sixth aspect of the present invention, in the first aspect, one of an image of the three-dimensional image data and the two-dimensional image may be displayed on the display in the image display step. The measurement method may further include a region selection step, a mark display step, and a position calculation step. In the region selection step, one of the two or more feature regions may be selected as a selected region. In the mark display step, a mark may be displayed on one of the image of the three-dimensional image data and the two-dimensional image. In the position calculation step, the position at which the mark is displayed may be calculated on the basis of information accepted through the input device. In the measurement step, the size of the subject may be measured on the basis of the three-dimensional coordinates of the two or more points including the point indicated by the point information when the mark is displayed in a region corresponding to the selected region and the point corresponding to the position of the mark is accepted in the point input step. The position at which the mark is displayed may be changed to a position in the region corresponding to the selected region when the mark is displayed outside the region corresponding to the selected region and the point corresponding to the position of the mark is accepted in the point input step.

According to a seventh aspect of the present invention, in the first aspect, the measurement method may further include a region selection step, a mark display step, and a position calculation step. In the region selection step, one of the two or more feature regions may be selected as a selected region. In the mark display step, a mark may be displayed on the image of the two or more feature regions. In the position calculation step, the position at which the mark is displayed may be calculated on the basis of information accepted through the input device. In the measurement step, the size of the subject may be measured on the basis of the three-dimensional coordinates of the two or more points including the point indicated by the point information when the mark is displayed in the selected region and the point corresponding to the position of the mark is accepted in the point input step. The position at which the mark is displayed may be changed to a position in the selected region when the mark is displayed outside the selected region and the point corresponding to the position of the mark is accepted in the point input step.

According to an eighth aspect of the present invention, in the second aspect, a feature region that is included in the two or more feature regions and includes a first point on the subject may be selected in the region selection step when the first point is accepted in the point input step. The size of the subject may be measured on the basis of the three-dimensional coordinates of the two or more points including the first point and a second point in the selected region when the second point is accepted in the point input step. The second point may be different from the first point.

According to a ninth aspect of the present invention, in the second aspect, when a position on the image of the two or more feature regions is accepted through the input device, a feature region that is included in the two or more feature regions

4 regions and corresponds to the accepted position may be selected in the region selection step.

According to a tenth aspect of the present invention, in the first aspect, the measurement method may further include a region selection step of selecting one of the two or more feature regions as a selected region. The selected region may be displayed in a first color in the image display step and a feature region that is included in the two or more feature regions and is different from the selected region may be displayed in a second color different from the first color in the image display step.

According to an eleventh aspect of the present invention, in the first aspect, the measurement method may further include a region selection step of selecting one of the two or more feature regions as a selected region. In the image display step, only the selected region may be displayed.

According to a twelfth aspect of the present invention, in the first aspect, the measurement method may further include a region selection step of selecting one of the two or more feature regions as a selected region. In the image display step, the selected region may be highlighted.

According to a thirteenth aspect of the present invention, a measurement method executed by a processor includes a generation step, a region detection step, an image display step, a point input step, a control step, and a measurement step. In the generation step, three-dimensional coordinates of two or more points on a subject are calculated on the basis of a two-dimensional image of the subject and three-dimensional image data including the three-dimensional coordinates of the two or more points are generated. In the region detection step, one or more feature regions on the subject are detected on the basis of the three-dimensional image data. The three-dimensional shape of the subject has a common feature in each of the one or more feature regions. In the image display step, one of an image of the three-dimensional image data, the two-dimensional image, and an image of the one or more feature regions is displayed on a display. In the point input step, a point on the subject is accepted through an input device after the image display step is executed and point information indicating the accepted point is generated. In the control step, one of first control and second control is executed. The point information is controlled in the first control so that the point information indicates a point in one of the one or more feature regions. A mark is displayed on one of the image of the three-dimensional image data, the two-dimensional image, and the image of the one or more feature regions in the second control. The position of the mark is restricted to a position in a region corresponding to one of the one or more feature regions. In the point input step, the point corresponding to the position of the mark is accepted. In the measurement step, the size of the subject is measured on the basis of three-dimensional coordinates of two or more points on the subject including the point indicated by the point information.

According to a fourteenth aspect of the present invention, a measurement device includes a processor. The processor calculates three-dimensional coordinates of two or more points on a subject on the basis of a two-dimensional image of the subject. The processor generates three-dimensional image data including the three-dimensional coordinates of the two or more points. The processor detects two or more feature regions on the subject on the basis of the three-dimensional image data. The three-dimensional shape of the subject has a common feature in each of the two or more feature regions. The processor displays an image of the two or more feature regions on a display so that the two or more feature regions are visually distinguished from each other.

The processor accepts a point on the subject through an input device after the image of the two or more feature regions is displayed. The processor generates point information indicating the accepted point. The processor measures the size of the subject on the basis of three-dimensional coordinates of two or more points on the subject including the point indicated by the point information.

According to a fifteenth aspect of the present invention, a non-transitory computer-readable recording medium saves a program causing a computer to execute a generation step, a region detection step, an image display step, a point input step, and a measurement step. In the generation step, three-dimensional coordinates of two or more points on a subject are calculated on the basis of a two-dimensional image of the subject and three-dimensional image data including the three-dimensional coordinates of the two or more points are generated. In the region detection step, two or more feature regions are detected on the subject on the basis of the three-dimensional image data. The three-dimensional shape of the subject has a common feature in each of the two or more feature regions. In the image display step, an image of the two or more feature regions is displayed on a display so that the two or more feature regions are visually distinguished from each other. In the point input step, a point on the subject is accepted through an input device after the image display step is executed and point information indicating the accepted point is generated. In the measurement step, the size of the subject is measured on the basis of three-dimensional coordinates of two or more points on the subject including the point indicated by the point information.

BRIEF DESCRIPTION OF THE DRAWINGS

FIG. 8 is a flow chart showing a procedure of three-dimensional measurement in the second embodiment of the present invention.

FIG. 9 is a flow chart showing a procedure of three-dimensional measurement in the second embodiment of the present invention.

DETAILED DESCRIPTION OF THE INVENTION

Hereinafter, embodiments of the present invention will be described with reference to the drawings.

First Embodiment

Figure 1:
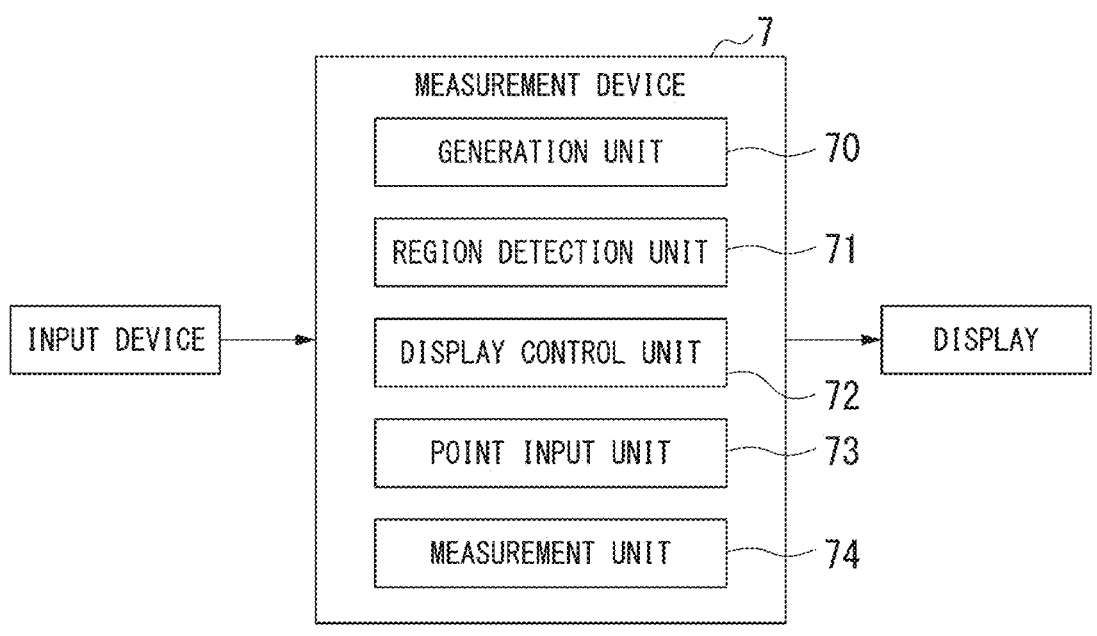
FIG. 1 is a block diagram showing a configuration of a measurement device according to a first embodiment of the present invention.

FIG. 1 shows a configuration of a measurement device 7 according to a first embodiment of the present invention. The measurement device 7 shown in FIG. 1 includes a generation unit 70, a region detection unit 71, a display control unit 72, a point input unit 73, and a measurement unit 74.

The generation unit 70 calculates three-dimensional coordinates of two or more points on a subject on the basis of a two-dimensional image of the subject and generates point-cloud data (three-dimensional image data) including the three-dimensional coordinates of the two or more points (generation step). The region detection unit 71 detects two or more feature regions on the subject on the basis of the point-cloud data (region detection step). The three-dimensional shape of the subject has a common feature in each of the two or more feature regions. The display control unit 72 displays an image of the two or more feature regions on a display so that the two or more feature regions are visually distinguished from each other (image display step). The point input unit 73 accepts a point on the subject through an input device and generates point information indicating the accepted point after the image of the two or more feature regions is displayed (point input step). The measurement unit 74 measures the size of the subject on the basis of three-dimensional coordinates of two or more points on the subject including the point indicated by the point information (measurement step).

Each unit shown in FIG. 1 may be constituted by at least one of a processor and a logic circuit. For example, the processor is at least one of a central processing unit (CPU), a digital signal processor (DSP), and a graphics-processing unit (GPU). For example, the logic circuit is at least one of an application-specific integrated circuit (ASIC) and a field-programmable gate array (FPGA). Each unit shown in FIG. 1 may include one or a plurality of processors. Each unit shown in FIG. 1 may include one or a plurality of logic circuits.

A computer of the measurement device 7 may read a program and execute the read program. The program includes commands defining the operations of the generation unit 70, the region detection unit 71, the display control unit 72, the point input unit 73, and the measurement unit 74. In other words, the functions of the generation unit 70, the region detection unit 71, the display control unit 72, the point input unit 73, and the measurement unit 74 may be realized by software.

The program described above may be recorded on a computer-readable recording medium. The program may be transmitted from a computer storing the program to the measurement device 7 through a transmission medium or transmission waves in a transmission medium. The "transmission medium" transmitting the program is a medium having a function of transmitting information. The medium having the function of transmitting information includes a network (communication network) such as the Internet and a communication circuit line (communication line) such as a telephone line. The program described above may realize some of the functions described above. In addition, the program described above may be a differential file (differential program). The functions described above may be realized by a combination of a program that has already been recorded in a computer and a differential program.

Figure 2:
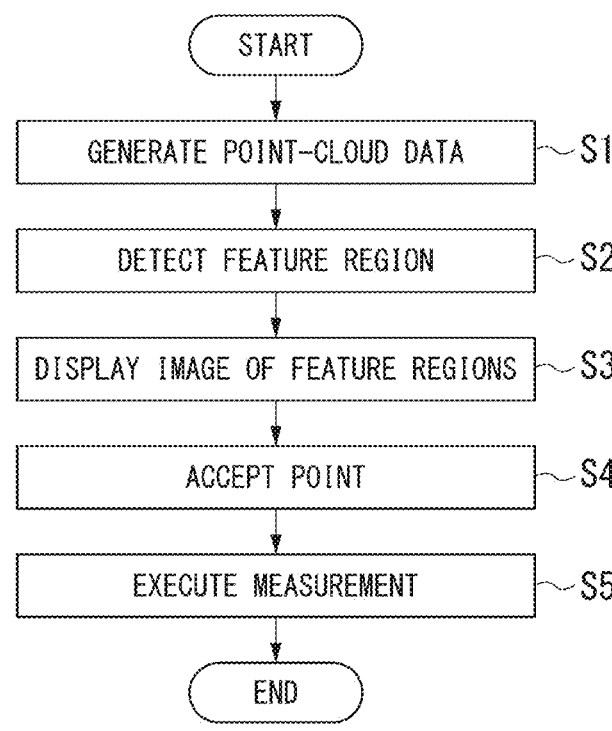
FIG. 2 is a flow chart showing a procedure of three-dimensional measurement in the first embodiment of the present invention.

Three-dimensional measurement in the first embodiment will be described by using FIG. 2. FIG. 2 shows a procedure of the three-dimensional measurement.

The generation unit 70 calculates three-dimensional coordinates (3D coordinates) of two or more points on a subject on the basis of a two-dimensional image (2D image) of the subject and generates point-cloud data including the 3D coordinates of the two or more points (Step S1). Step S1 corresponds to the generation step.

In a case in which the 2D image of the subject is a stereo image, one 2D image includes an image of the subject seen from a first viewpoint and an image of the subject seen from a second viewpoint different from the first viewpoint. The generation unit 70 calculates 3D coordinates corresponding to each pixel of the 2D image. The generation unit 70 generates the point-cloud data including the 3D coordinates of the two or more points on the subject. The 3D coordinates of each of the two or more points are associated with a point on the 2D image in the point-cloud data. Specifically, the 3D coordinates in the point-cloud data are associated with a pixel on the 2D image. For example, the point-cloud data include the 3D coordinates and position information of the pixel on the 2D image.

The generation unit 70 may calculate 3D coordinates of two or more points on a subject by using two or more images and by applying structure-from-motion (SfM). The generation unit 70 may calculate 3D coordinates of two or more points on a subject by using two or more 2D images of the subject on which two or more stripe patterns having different spatial phases are projected and by applying a phase-shift method. The generation unit 70 may calculate 3D coordinates of two or more points on a subject by using one 2D image of the subject on which patterned light having randomly disposed bright and dark parts is emitted. A method of generating the point-cloud data is not limited to the above-described methods.

The generation unit 70 may generate a three-dimensional image (3D image) for displaying the point-cloud data on a display. The 3D image is an image of a three-dimensional shape (3D shape) indicated by the point-cloud data. The 3D image includes color data of each pixel. Each pixel of the 3D image is associated with the 3D coordinates. The generation unit 70 may generate a 3D image corresponding to each of the two or more different viewpoints. The generation unit 70 may generate an image of the feature regions. The image of the feature regions includes color data of each pixel. Each pixel of the image of the feature regions is associated with the 3D coordinates. Each pixel of the image of the feature regions is associated with a pixel of the 2D image or a pixel of the 3D image.

After Step S1, the region detection unit 71 detects two or more feature regions on the subject on the basis of the point-cloud data (Step S2). Step S2 corresponds to the region detection step.

The region detection unit 71 extracts features of the 3D shape of the subject by using the point-cloud data. The region detection unit 71 assigns each point corresponding to the 3D coordinates in the point-cloud data to one of the two or more feature regions in accordance with the extracted features. The 3D shape of the subject has a common feature in one feature region. The feature of the 3D shape of the subject is different between two or more different feature regions. Only one point may be assigned to one feature region. When two or more points are assigned to one feature region, the two or more points meet a common condition indicating a feature of the 3D shape of the subject. The condition met by a point in a first feature region and the condition met by a point in a second feature region different from the first feature region are different from each other.

Segmentation is known as a simple method of classifying each point corresponding to the point-cloud data. For example, the region detection unit 71 can use Euclidean cluster extraction in segmentation. This is a function installed in a point cloud library (PCL) that is open source software.

The region detection unit 71 determines a point within a predetermined distance of each point as a near-point by using this function. One point and its near-point are on the same object. For example, in a case in which the subject includes a first object and a second object apart from each other, each point corresponding to the point-cloud data is classified into any one of a point on the first object and a point on the second object. Each of the first object and the second object is a feature region (segment). In this case, two or more points in one feature region have a feature that the points are on the same object.

The region detection unit 71 may use a watershed algorithm, deep learning, or the like for segmentation. The region detection unit 71 may calculate a normal line perpendicular to the surface of the subject on the basis of the point-cloud data and may detect an edge or a step of the subject as a feature region on the basis of the change in the direction of the normal line. For example, the region detection unit 71 may detect a first feature region constituted by an edge or a step and may detect a second feature region constituted by a part other than the edge or the step. The region detection unit 71 may detect an edge of the subject by performing image processing on the 2D image of the subject. The region detection unit 71 may detect a feature region corresponding to the edge on the 2D image of the subject from the 3D shape of the subject indicated by the point-cloud data. The region detection unit 71 may detect a feature region on the basis of the brightness or the color of the 2D image of the subject or the 3D image of the point-cloud data. The region detection unit 71 may execute matching processing on a stereo image of the subject and may detect a feature region on the basis of the correlation value obtained in the matching processing.

Figure 3:
FIG. 3 is a diagram showing an example of a three-dimensional image of point-cloud data in the first embodiment of the present invention.

FIG. 3 shows an example of the 3D image of the point-cloud data. The generation unit 70 converts the point-cloud data into mesh data and adds texture to the mesh data. The generation unit 70 generates a 3D image G1 by executing this processing.

Figure 4:
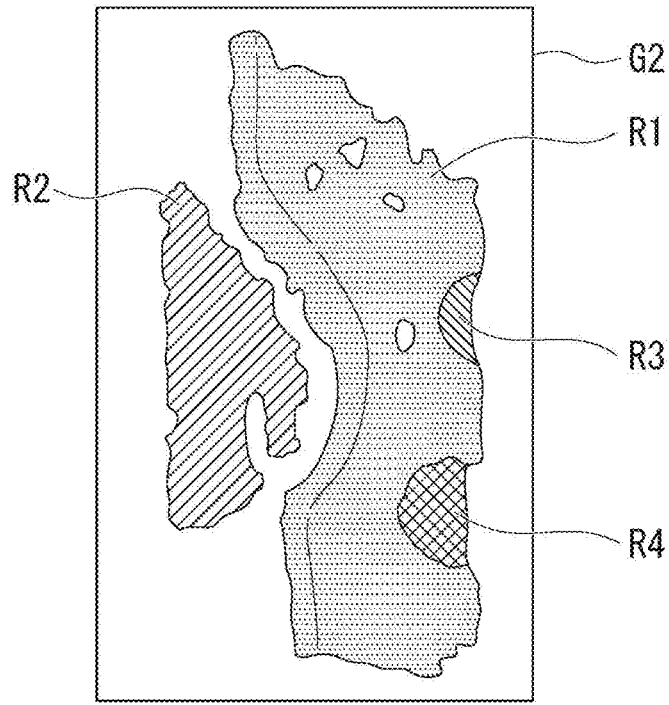
FIG. 4 is a diagram showing an example of an image of a feature region in the first embodiment of the present invention.

FIG. 4 shows an example of an image of the feature regions. The generation unit 70 generates an image G2 of the feature regions on the basis of the information of the two or more feature regions detected by the region detection unit 71. A feature region R1, a feature region R2, a feature region R3, and a feature region R4 are displayed on the image G2.

After Step S2, the display control unit 72 displays an image of the two or more feature regions on the display so that the two or more feature regions are visually distinguished from each other (Step S3). Step S3 corresponds to the image display step.

The display control unit 72 outputs the image of the two or more feature regions detected by the region detection unit 71 to the display and causes the display to display the image.

For example, the display control unit 72 displays the image of the feature regions and the 2D image of the subject on the display. The display control unit 72 may display the image of the feature regions and the 3D image of the point-cloud data on the display. The display control unit 72 may display only the image of the feature regions on the display without displaying the 2D image of the subject and the 3D image of the point-cloud data on the display.

The image of the feature regions may be superimposed on the 2D image of the subject. The display control unit 72 may superimpose data of each pixel in the image of the feature regions on data of a pixel in the 2D image of the subject associated with a pixel in the image of the feature regions. The display control unit 72 may display the 2D image of the subject on which the image of the feature regions is superimposed on the display. In the 2D image, the unevenness of the surface of the subject and the positions of the feature regions are visible.

The image of the feature regions may be superimposed on the 3D image of the point-cloud data. The display control unit 72 may superimpose data of each pixel in the image of the feature regions on data of a pixel in the 3D image of the point-cloud data associated with a pixel in the image of the feature regions. The display control unit 72 may display the 3D image of the point-cloud data on which the image of the feature regions is superimposed on the display. In the 3D image, the unevenness of the surface of the subject and the positions of the feature regions are visible.

For example, the two or more feature regions are displayed in different colors in the image. Lines showing the borders between the two or more feature regions may be superimposed on the image. A character, a symbol, a mark, or the like showing each feature region may be displayed on each feature region. A user can visually distinguish the two or more feature regions on the image displayed on the display.

After Step S3, the point input unit 73 accepts a point on the subject through an input device and generates point information indicating the accepted point (Step S4). Step S4 corresponds to the point input step.

A user inputs information of a point on the subject into an input device by operating the input device. The input device is a user interface. For example, the input device includes at least one of a button, a switch, a key, a mouse, a joystick, a touch pad, a track ball, and a touch panel. The input device outputs the information of a point input by a user. The point input unit 73 accepts a point on the subject by acquiring the information output from the input device. The point input unit 73 generates point information indicating the position of a point in at least one of the 2D image of the subject, the 3D image of the point-cloud data, and the image of the feature regions.

In a case in which the point input unit 73 accepts a point on the 2D image of the subject, the point information includes the coordinates of a pixel corresponding to the point. The coordinates of the pixel are associated with the 3D coordinates in the point-cloud data. In a case in which the point input unit 73 accepts a point on the 3D image of the point-cloud data, the point information includes the 3D coordinates of the point. In a case in which the point input unit 73 accepts a point on the image of the feature regions, the point information includes the coordinates of a pixel corresponding to the point. The coordinates of the pixel are associated with the 3D coordinates in the point-cloud data. In a case in which the point input unit 73 accepts a point on the 2D image of the subject on which the image of the feature regions is superimposed, the point information includes the coordinates of a pixel corresponding to the point. The coordinates of the pixel are associated with the 3D coordinates in the point-cloud data. In a case in which the point input unit 73 accepts a point on the 3D image of the point-cloud data on which the image of the feature regions is superimposed, the point information includes the 3D coordinates of the point.

For example, in a case in which the distance-between-two-points measurement is executed, the point input unit 73 generates point information indicating the position of each of two measurement points. In a case in which the line-based measurement is executed, the point input unit 73 generates point information indicating the position of each of one measurement point and two reference points defining a reference line. In a case in which the plane-based measurement is executed, the point input unit 73 generates point information indicating the position of each of one measurement point and three or more reference points defining a reference plane. In a case in which area measurement or perimeter measurement is executed, the point input unit 73 generates point information indicating the position of each of three or more measurement points. In a case in which at least one of the line-based measurement, the plane-based measurement, the area measurement, and the perimeter measurement is executed, the point-cloud data include 3D coordinates of three or more points on the subject.

The point input unit 73 may accept only some of the two or more points used for measurement. For example, one or more points may be detected in the 2D image of the subject or the 3D image of the point-cloud data through image processing such as feature-point detection, and point information of the detected points may be generated. In this example, the one or more points accepted by the point input unit 73 and the one or more points detected through image processing are used for measurement.

For example, in a case in which the line-based measurement is executed, two reference points may be detected through image processing and the point input unit 73 may accept one measurement point. Alternatively, the point input unit 73 may accept two reference points, and one measurement point may be detected through image processing. For example, one measurement point may be detected through image processing so that the three-dimensional distance (3D distance) between a reference line and the measurement point becomes the greatest.

For example, in a case in which the plane-based measurement is executed, three reference points may be detected through image processing and the point input unit 73 may accept one measurement point. Alternatively, the point input unit 73 may accept three reference points, and one measurement point may be detected through image processing. For example, one measurement point may be detected through image processing so that the 3D distance between a reference plane and the measurement point becomes the greatest.

The point accepted by the point input unit 73 does not need to be one point corresponding to one pixel on the screen. The point accepted by the point input unit 73 may include a region having an arbitrary size. The point accepted by the point input unit 73 may include a region that can be designated in units of sub-pixels.

Figure 5:
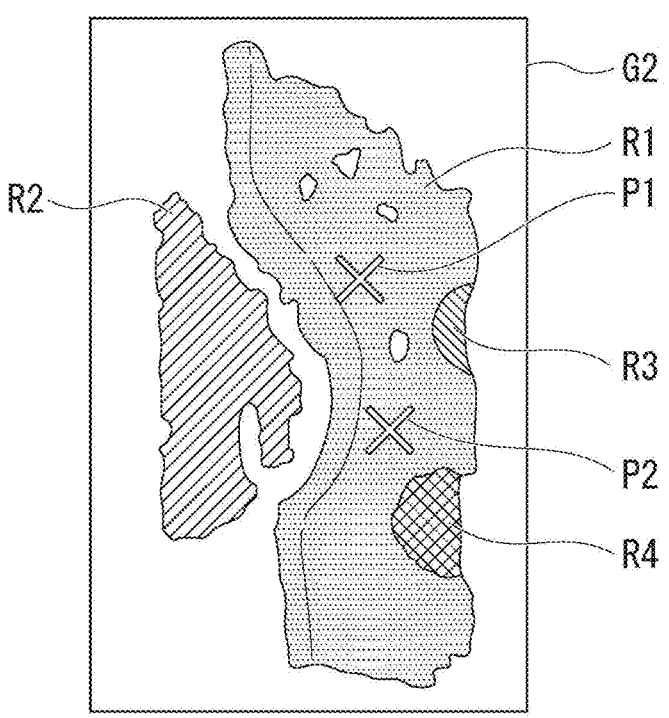
FIG. 5 is a diagram showing an example of an image displayed on a display in the first embodiment of the present invention.

FIG. 5 shows an example of an image displayed on the display in Step S4. The same image G2 as that shown in FIG. 4 is displayed on the display. For example, a cursor not shown in FIG. 5 is displayed on the image G2. A user inputs information indicating the position of the cursor into the input device. The display control unit 72 displays the cursor at a position on the image G2 corresponding to the information. When a user performs a predetermined operation, a point corresponding to the position of the cursor is input into the input device. At this time, the point input unit 73 accepts the point. The cursor does not need to be displayed. In a case in which the input device and the display are constituted as a touch panel, a user inputs information of a point by touching the screen of the display. At this time, the point input unit 73 accepts the point.

In the example shown in FIG. 5, a user inputs information of two points into the input device. The point input unit 73 accepts a point P1 and a point P2 shown in FIG. 5. The point P1 and the point P2 are in a feature region RE Marks indicating the point P1 and the point P2 are displayed on the image G2. The mark indicating the point accepted by the point input unit 73 does not need to be displayed. In the example shown in FIG. 5, four feature regions in the image G2 are visually recognizable. Therefore, a user can easily designate a point in a feature region intended by the user.

Figure 6:
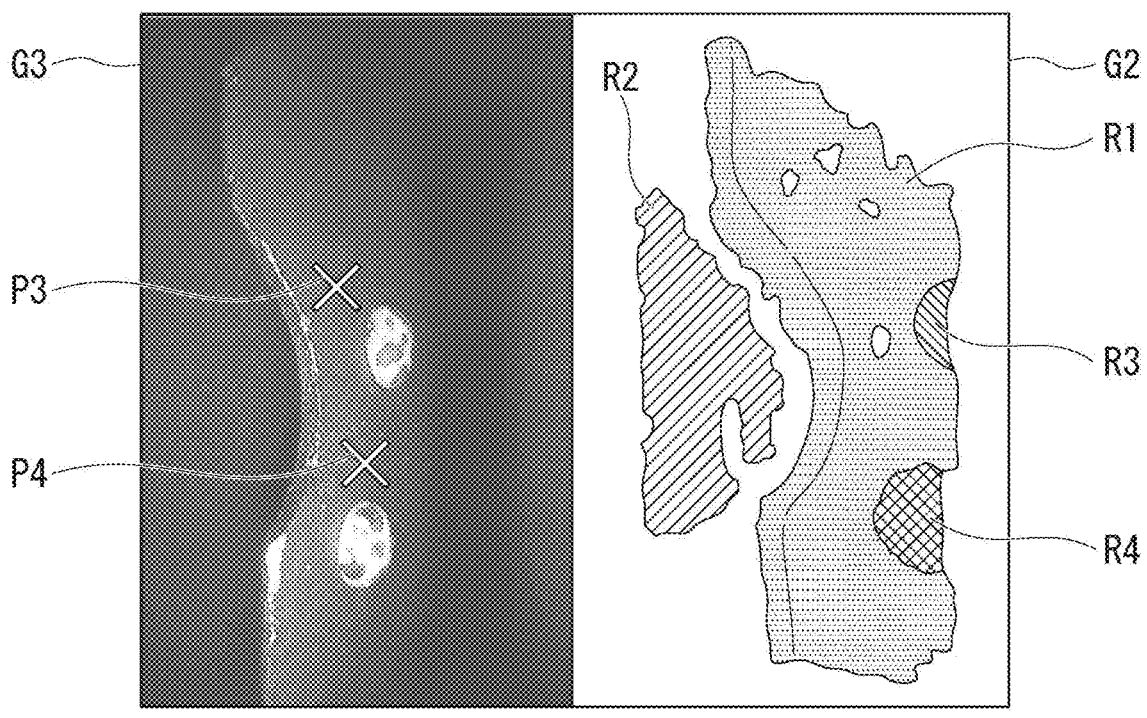
FIG. 6 is a diagram showing an example of an image displayed on the display in the first embodiment of the present invention.

FIG. 6 shows another example of an image displayed on the display in Step S4. The same image G2 as that shown in FIG. 4 and a 2D image G3 of the subject are displayed on the display. For example, a cursor not shown in FIG. 6 is displayed on the 2D image G3. A user inputs information indicating the position of the cursor into the input device. The display control unit 72 displays the cursor at a position on the 2D image G3 corresponding to the information.

When a user performs a predetermined operation, a point corresponding to the position of the cursor is input into the input device. At this time, the point input unit 73 accepts the point. The cursor does not need to be displayed. In a case in which the input device and the display are constituted as a touch panel, a user inputs information of a point by touching the screen of the display. At this time, the point input unit 73 accepts the point. The point input unit 73 identifies a point in the point-cloud data associated with the point accepted on the 2D image G3 and generates point information of the point.

In the example shown in FIG. 6, a user inputs information of two points into the input device. The point input unit 73 accepts a point P3 and a point P4 shown in FIG. 6. Marks indicating the point P3 and the point P4 are displayed on the 2D image G3. The mark indicating the point accepted by the point input unit 73 does not need to be displayed. In the example shown in FIG. 6, a user designates a point on the 2D image G3 by referring to the image G2. Therefore, a user can easily designate a point on a region corresponding to a feature region intended by the user. The display control unit 72 may display a point corresponding to the point accepted by the point input unit 73 on the image G2.

In the example shown in FIG. 6, the image G2 and the 2D image G3 are arranged in the horizontal direction of the display. The disposition of the image G2 and the 2D image G3 is not limited to this example. For example, the image G2 and the 2D image G3 may be arranged in the vertical direction of the display. At this time, the image G2 and the 2D image G3 may rotate by 90 degrees. Part of the image G2 and part of the 2D image G3 may overlap each other.

After Step S4, the measurement unit 74 measures the size of the subject on the basis of the 3D coordinates of two or more points on the subject including the point indicated by the point information (Step S5). Step S5 corresponds to the measurement step. When Step S5 is executed, the three-dimensional measurement is completed.

The measurement unit 74 acquires the 3D coordinates of each of the two or more points on the subject. When the point information includes coordinates of a pixel in the 2D image of the subject, the measurement unit 74 acquires 3D coordinates associated with the coordinates of the pixel from the point-cloud data. When the point information includes 3D coordinates of a point in the point-cloud data, the measurement unit 74 acquires the 3D coordinates from the point information. When the point information includes coordinates of a pixel in the image of the feature regions, the measurement unit 74 acquires 3D coordinates associated with the coordinates of the pixel from the point-cloud data.

The measurement unit 74 measures the size of the subject on the basis of the 3D coordinates of the two or more points on the subject. For example, in the distance-between-two-points measurement, the measurement unit 74 measures the 3D distance between the two measurement points indicated by the point information. In the line-based measurement, the measurement unit 74 calculates a reference line on the basis of the two reference points indicated by the point information and measures the 3D distance between the reference line and one measurement point indicated by the point information. In the plane-based measurement, the measurement unit 74 calculates a reference plane on the basis of the three reference points indicated by the point information and measures the 3D distance between the reference plane and one measurement point indicated by the point information. In the area measurement, the measurement unit 74 calculates the area of a region surrounded by the three or more measurement points indicated by the point information. In the perimeter measurement, the measurement unit 74 calculates the perimeter of a region surrounded by the three or more measurement points indicated by the point information. Measurement executed by the measurement unit 74 is not limited to the above-described examples.

In the example shown in FIG. 5, the image of the feature regions is displayed on the display, and a point on the image is input into the input device. In the example shown in FIG. 6, the image of the feature regions and the 2D image of the subject are displayed on the display, and a point on the 2D image of the subject is input into the input device. A combination of an image displayed on the display and an image used for inputting a point is not limited to these examples.

The 2D image of the subject may be displayed on the display, and a point on the 2D image may be input into the input device. The 3D image of the point-cloud data may be displayed on the display, and a point on the 3D image may be input into the input device.

The image of the feature regions and the 2D image of the subject may be displayed on the display, and a point on the image of the feature regions may be input into the input device. The image of the feature regions and the 3D image of the point-cloud data may be displayed on the display, and a point on the 3D image may be input into the input device. The image of the feature regions and the 3D image of the point-cloud data may be displayed on the display, and a point on the image of the feature regions may be input into the input device.

The 2D image of the subject on which the image of the feature regions is superimposed may be displayed on the display, and a point on the 2D image may be input into the input device. The 3D image of the point-cloud data on which the image of the feature regions is superimposed may be displayed on the display, and a point on the 3D image may be input into the input device.

The 3D image of the point-cloud data on which the image of the feature regions is superimposed and the 2D image of the subject may be displayed on the display, and a point on the 2D image may be input into the input device. The 3D image of the point-cloud data on which the image of the feature regions is superimposed and the 2D image of the subject may be displayed on the display, and a point on the 3D image may be input into the input device.

The 2D image of the subject on which the image of the feature regions is superimposed and the 3D image of the point-cloud data may be displayed on the display, and a point on the 3D image may be input into the input device. The 2D image of the subject on which the image of the feature regions is superimposed and the 3D image of the point-cloud data may be displayed on the display, and a point on the 2D image may be input into the input device.

In the first embodiment, the measurement device 7 displays the image of the two or more feature regions on the display. A user can easily designate a point in a feature region intended by the user by referring to the image displayed on the display. Therefore, the measurement device 7 can support correct designation of a point on the subject.

Second Embodiment

Figure 7:
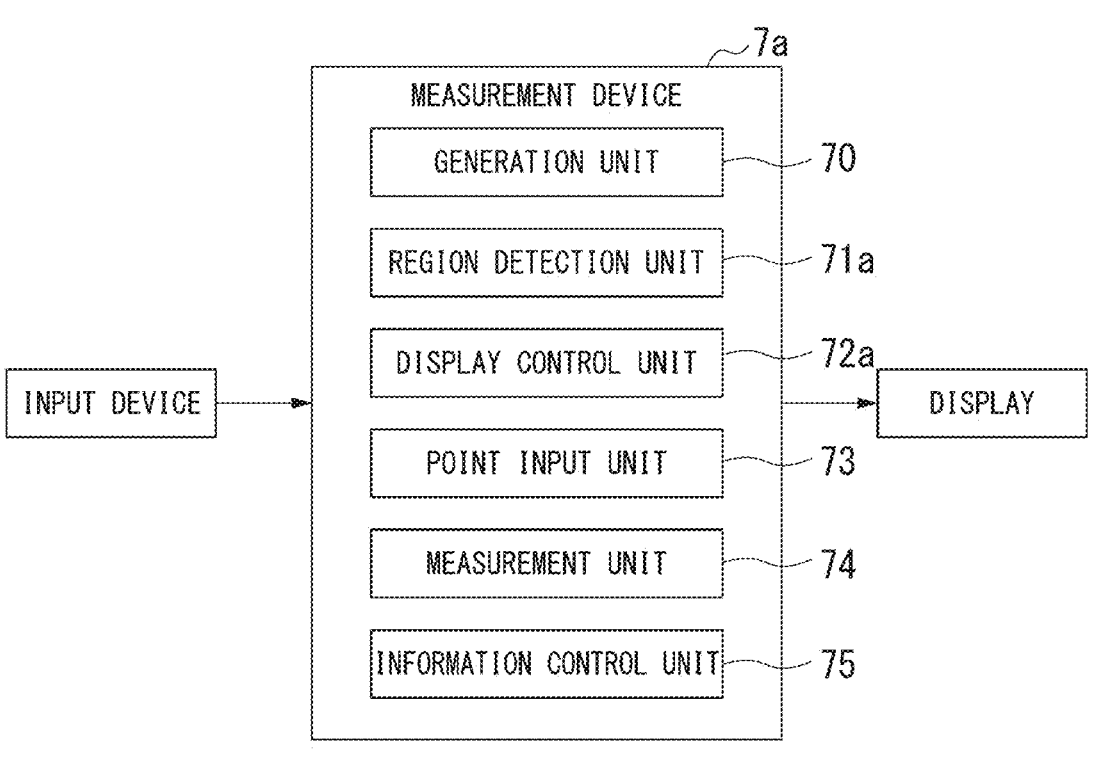
FIG. 7 is a block diagram showing a configuration of a measurement device according to a second embodiment of the present invention.

A second embodiment of the present invention will be described. FIG. 7 shows a configuration of a measurement device 7a according to the second embodiment. The measurement device 7a shown in FIG. 7 includes a generation unit 70, a region detection unit 71a, a display control unit 72a, a point input unit 73, a measurement unit 74, and an information control unit 75. The same configuration as that shown in FIG. 1 will not be described.

Each unit shown in FIG. 7 may be constituted by at least one of a processor and a logic circuit. Each unit shown in FIG. 7 may include one or a plurality of processors. Each unit shown in FIG. 7 may include one or a plurality of logic circuits.

A computer of the measurement device 7a may read a program and execute the read program. The program is realized as with the program executed by the computer of the measurement device 7 shown in FIG. 1.

The region detection unit 71a detects one or more feature regions on a subject on the basis of the point-cloud data (region detection step). The region detection unit 71 in the first embodiment detects two or more feature regions, but the region detection unit 71a in the second embodiment may detect one feature region. For example, in a case in which the subject is constituted by only one object, the region detection unit 71a detects one feature region. The 3D shape of the subject has a common feature in one feature region. The feature of the 3D shape of the subject is different between two or more different feature regions. Only one point may be assigned to one feature region. When two or more points are assigned to one feature region, the two or more points meet a common condition indicating a feature of the 3D shape of the subject. The condition met by a point in a first feature region and the condition met by a point in a second feature region different from the first feature region are different from each other.

The display control unit 72a displays one of a 3D image of the point-cloud data, a 2D image of the subject, and an image of one or more feature regions on the display (image display step). The 3D image of the point-cloud data is an image of the 3D shape indicated by the point-cloud data.

The information control unit 75 executes one of first control and second control (control step). The information control unit 75 controls point information in the first control so that the point information indicates a point in one of the one or more feature regions. The point information indicates a point accepted by the point input unit 73. The information control unit 75 displays a mark on one of the 3D image of the point-cloud data, the 2D image of the subject, and the image of the one or more feature regions in the second control. The mark is an icon, a pointer, or the like. For example, the mark is a cursor. The information control unit 75 restricts the position of the mark to a position in a region corresponding to one of the one or more feature regions. The point input unit 73 accepts a point corresponding to the position of the mark. The display control unit 72*a* may execute the second control. In this case, the display control unit 72*a* has the function of the information control unit 75.

Three-dimensional measurement in the second embodiment will be described by using FIG. 8 and FIG. 9. FIG. 8 shows a procedure of the three-dimensional measurement. The same processing as that shown in FIG. 2 will not be described.

After Step S1, the region detection unit 71*a* detects one or more feature regions on a subject on the basis of the point-cloud data (Step S2*a*). Step S2*a* corresponds to the region detection step. The region detection unit 71*a* can detect a feature region by using the same method as that shown in the first embodiment.

After Step S2*a*, the display control unit 72*a* displays one of the 3D image of the point-cloud data, the 2D image of the subject, and the image of the one or more feature regions on the display (Step S3*a*). Step S3*a* corresponds to the image display step.

For example, the display control unit 72*a* displays the 3D image of the point-cloud data on the display without displaying the 2D image of the subject and the image of the feature regions. The display control unit 72*a* may display the 2D image of the subject on the display without displaying the 3D image of the point-cloud data and the image of the feature regions. The display control unit 72*a* may display the image of the feature regions on the display without displaying the 3D image of the point-cloud data and the 2D image of the subject.

The image displayed on the display in Step S3*a* has only to be one of the 3D image of the point-cloud data, the 2D image of the subject, and the image of the feature regions. However, the display control unit 72*a* may display two or more of the 3D image of the point-cloud data, the 2D image of the subject, and the image of the feature regions on the display. For example, the display control unit 72*a* may display the 3D image of the point-cloud data and the image of the feature regions on the display. The display control unit 72*a* may display the 2D image of the subject and the image of the feature regions on the display. The display control unit 72*a* may display the 3D image of the point-cloud data on which the image of the feature regions is superimposed on the display or may display the 2D image of the subject on which the image of the feature regions is superimposed on the display.

After Step S3*a*, the point input unit 73 accepts a point on the subject through the input device and generates point information indicating the accepted point in Step S4. After Step S4, the information control unit 75 executes the first control. In other words, the information control unit 75 controls the point information so that the point information generated in Step S4 indicates a point in one of the one or more feature regions (Step S6). Step S6 corresponds to the control step.

For example, only the point information indicating a point in one feature region becomes valid, and the 3D coordinates of the point are used for measurement. Alternatively, the point information indicating a point outside one feature region is updated to point information indicating a point in the feature region. Specific examples of the first control will be described in fourth to sixth embodiments. After Step S6, Step S5 is executed.

FIG. 9 shows another procedure of the three-dimensional measurement. The same processing as that shown in FIG. 2 and FIG. 8 will not be described.

After Step S3*a*, the information control unit 75 executes the second control. In other words, the information control unit 75 displays a mark on one of the 3D image of the point-cloud data, the 2D image of the subject, and the image of the one or more feature regions. When the 3D image of the point-cloud data is displayed on the display in Step S3*a*, the mark is displayed on the 3D image. When the 2D image of the subject is displayed on the display in Step S3*a*, the mark is displayed on the 2D image. When the image of the feature regions is displayed on the display in Step S3*a*, the mark is displayed on the image. The information control unit 75 restricts the position of the mark to a position in a region corresponding to one of the one or more feature regions (Step S7). Step S7 corresponds to the control step.

For example, the mark moves only in a region corresponding to one feature region. Alternatively, when the mark moves to the outside of a region corresponding to one feature region, the position of the mark is forcibly changed to a position in the feature region. Specific examples of the second control will be described in fifth to seventh embodiments. The display control unit 72*a* may execute Step S7.

After Step S7, the point input unit 73 accepts a point corresponding to the position of the mark in Step S4.

The order of processing in the three-dimensional measurement is not limited to that shown in FIG. 8 and FIG. 9. For example, the 3D image of the point-cloud data may be displayed on the display before Step S2*a* is executed. The 2D image of the subject may be displayed on the display before Step S1 or Step S2*a* is executed. After the point input unit 73 accepts the point in Step S4, the information control unit 75 may execute the second control on the basis of the point in Step S7.

In the second embodiment, the measurement device 7*a* executes one of the first control and the second control. In the first control, the point information is controlled so that the point information indicates a position in one of the one or more feature regions. In the second control, the position of the mark on the image is restricted to a position in a region corresponding to one of the one or more feature regions. The 3D coordinates of a point in one feature region are used for measurement. Therefore, the measurement device 7*a* can support correct designation of a point on the subject.

Third Embodiment

A third embodiment of the present invention will be described. Hereinafter, an example in which the measurement device is an endoscope device will be described. The measurement device has only to be a device having a measurement function and is not limited to an endoscope device. The measurement device may be built-in equipment mounted on a specific device or a system. The measurement device may operate in a cloud environment. A subject is an industrial product.

Figure 10:
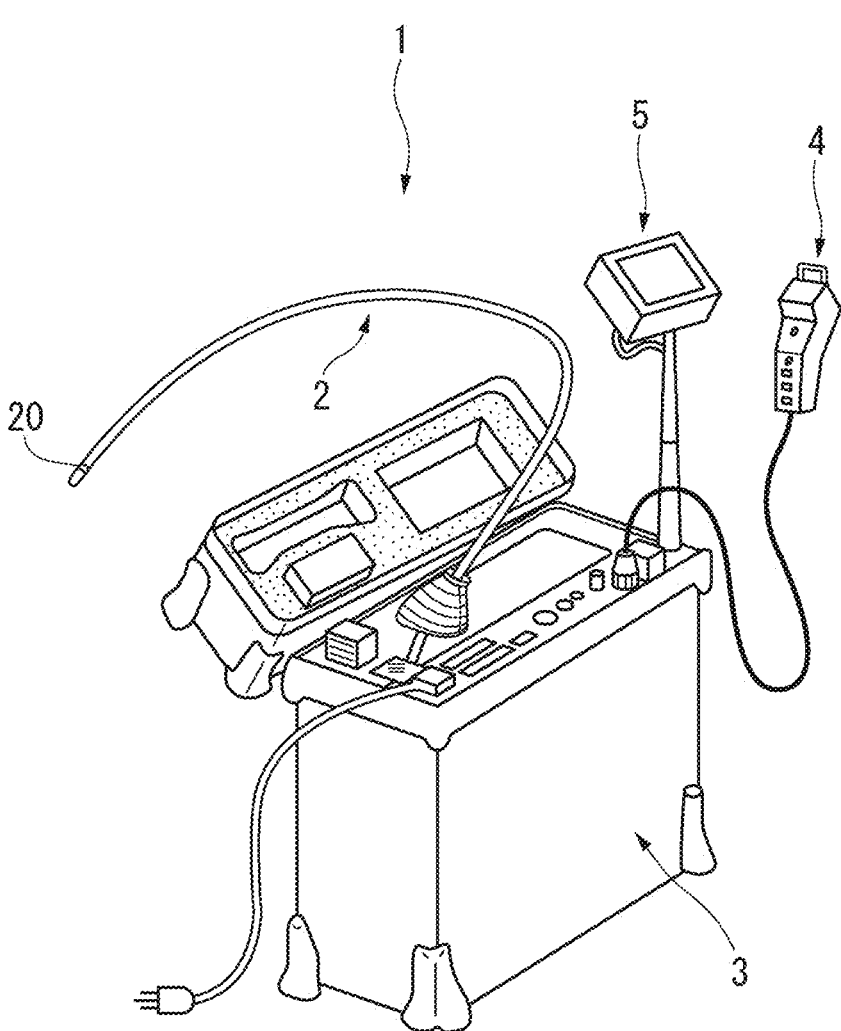
FIG. 10 is a perspective view showing an entire configuration of an endoscope device according to a third embodiment of the present invention.
Figure 11:
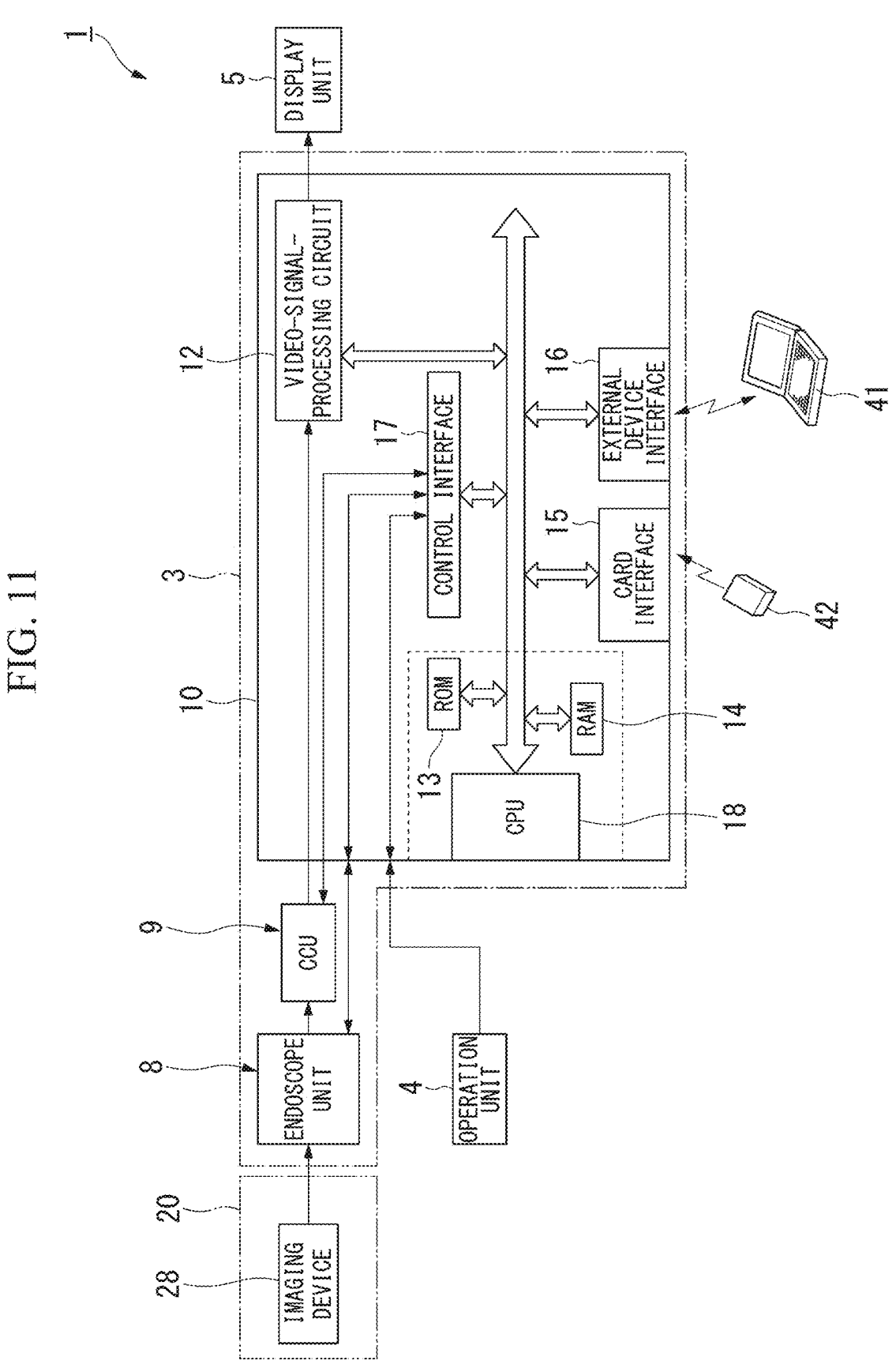
FIG. 11 is a block diagram showing an internal configuration of the endoscope device according to the third embodiment of the present invention.

FIG. 10 shows an external appearance of an endoscope device 1 according to the third embodiment. FIG. 11 shows an internal configuration of the endoscope device 1. The endoscope device 1 images a subject and generates an image. In order to observe various subjects, an inspector can perform replacement of an optical adaptor mounted at a distal end of an insertion unit 2, selection of a built-in video-processing program, and addition of a video-processing program.

The endoscope device 1 shown in FIG. 10 includes the insertion unit 2, a main body unit 3, an operation unit 4, and a display unit 5.

The insertion unit 2 is inserted into the inside of a subject. The insertion unit 2 has a long and thin bendable tube shape from the distal end 20 to a base end portion. The insertion unit 2 images a subject and outputs an imaging signal to the main body unit 3. An optical adapter is mounted on the distal end 20 of the insertion unit 2. For example, a single-eye optical adapter is mounted on the distal end 20 of the insertion unit 2. The main body unit 3 is a control device including a housing unit that houses the insertion unit 2. The operation unit 4 accepts an operation for the endoscope device 1 from a user. The display unit 5 includes a display screen and displays an image of a subject acquired by the insertion unit 2, an operation menu, and the like on the display screen.

The operation unit 4 is a user interface (input device). For example, the operation unit 4 is at least one of a button, a switch, a key, a mouse, a joystick, a touch pad, a track ball, and a touch panel. The display unit 5 is a monitor (display) such as a liquid crystal display (LCD). The display unit 5 may be a touch panel. In such a case, the operation unit 4 and the display unit 5 are integrated.

The main body unit 3 shown in FIG. 11 includes an endoscope unit 8, a camera control unit (CCU) 9, and a control device 10. The endoscope unit 8 includes a light source device and a bending device not shown in the drawing. The light source device supplies illumination light that is necessary for observation. The bending device bends a bending mechanism built in the insertion unit 2. An imaging device 28 is built in the distal end 20 of the insertion unit 2. The imaging device 28 is an image sensor. The imaging device 28 photo-electrically converts an optical image of a subject formed by an optical adaptor and generates an imaging signal. The CCU 9 drives the imaging device 28. The imaging signal output from the imaging device 28 is input into the CCU 9. The CCU 9 performs preprocessing including amplification, noise elimination, and the like for the imaging signal acquired by the imaging device 28. The CCU 9 converts the processed imaging signal into a video signal such as an NTSC signal.

The control device 10 includes a video-signal-processing circuit 12, a read-only memory (ROM) 13, a random-access memory (RAM) 14, a card interface 15, an external device interface 16, a control interface 17, and a central processing unit (CPU) 18.

The video-signal-processing circuit 12 performs predetermined video processing on the video signal output from the CCU 9. For example, the video-signal-processing circuit 12 performs video processing related to improvement of visibility. For example, the video processing is color reproduction, gray scale correction, noise suppression, contour enhancement, and the like. The video-signal-processing circuit 12 combines the video signal output from the CCU 9 and a graphic image signal generated by the CPU 18. The graphic image signal includes an image of the operation screen, measurement information, and the like. The measurement information includes a 3D image of the point-cloud data, an image of feature regions, a measurement result, or the like. The video-signal-processing circuit 12 outputs a combined video signal to the display unit 5. In addition, the video-signal-processing circuit 12 outputs image data on the basis of the video signal output from the CCU 9 to the CPU 18.

The ROM 13 is a nonvolatile recording medium on which a program for the CPU 18 to control the operation of the endoscope device 1 is recorded. The RAM 14 is a volatile recording medium that temporarily stores information used by the CPU 18 for controlling the endoscope device 1. The CPU 18 controls the operation of the endoscope device 1 on the basis of the program recorded on the ROM 13.

A memory card 42 that is a removable recording medium is connected to the card interface 15. The card interface 15 inputs control-processing information, image information, and the like stored on the memory card 42 into the control device 10. In addition, the card interface 15 records control-processing information, image information, and the like generated by the endoscope device 1 on the memory card 42.

An external device such as a USB device is connected to the external device interface 16. For example, a personal computer (PC) 41 is connected to the external device interface 16. The external device interface 16 transmits information to the PC 41 and receives information from the PC 41. In this way, the monitor of the PC 41 can display information. In addition, by inputting an instruction into the PC 41, a user can perform an operation related to control of the endoscope device 1.

The control interface 17 performs communication with the operation unit 4, the endoscope unit 8, and the CCU 9 for operation control. The control interface 17 notifies the CPU 18 of an instruction input into the operation unit 4 by a user. The control interface 17 outputs control signals used for controlling the light source device and the bending device to the endoscope unit 8. The control interface 17 outputs a control signal used for controlling the imaging device 28 to the CCU 9.

A program executed by the CPU 18 may be recorded on a computer-readable recording medium. The program recorded on this recording medium may be read and executed by a computer other than the endoscope device 1. For example, the program may be read and executed by the PC 41. The PC 41 may control the endoscope device 1 by transmitting control information used for controlling the endoscope device 1 to the endoscope device 1 in accordance with the program. Alternatively, the PC 41 may acquire a video signal from the endoscope device 1 and may process the acquired video signal.

As described above, the endoscope device 1 includes the imaging device 28 and the CPU 18. The imaging device 28 images a subject and generates an imaging signal. The imaging signal includes an image of the subject. Accordingly, the imaging device 28 acquires the image of the subject generated by capturing the image of the subject. The image acquired by the imaging device 28 is input into the CPU 18 via the video-signal-processing circuit 12.

The imaging device 28 has a function of an image acquisition unit that acquires an image of a subject. The image acquisition unit may be an image input device. For example, in a case in which the PC 41 operates as a measurement device, the image acquisition unit is a communication interface (communicator) that performs communication with the endoscope device 1. The image acquisition unit may be a wireless communicator. The image acquisition unit may be a reading circuit that reads an image from a recording medium on which the image is recorded.

Figure 12:
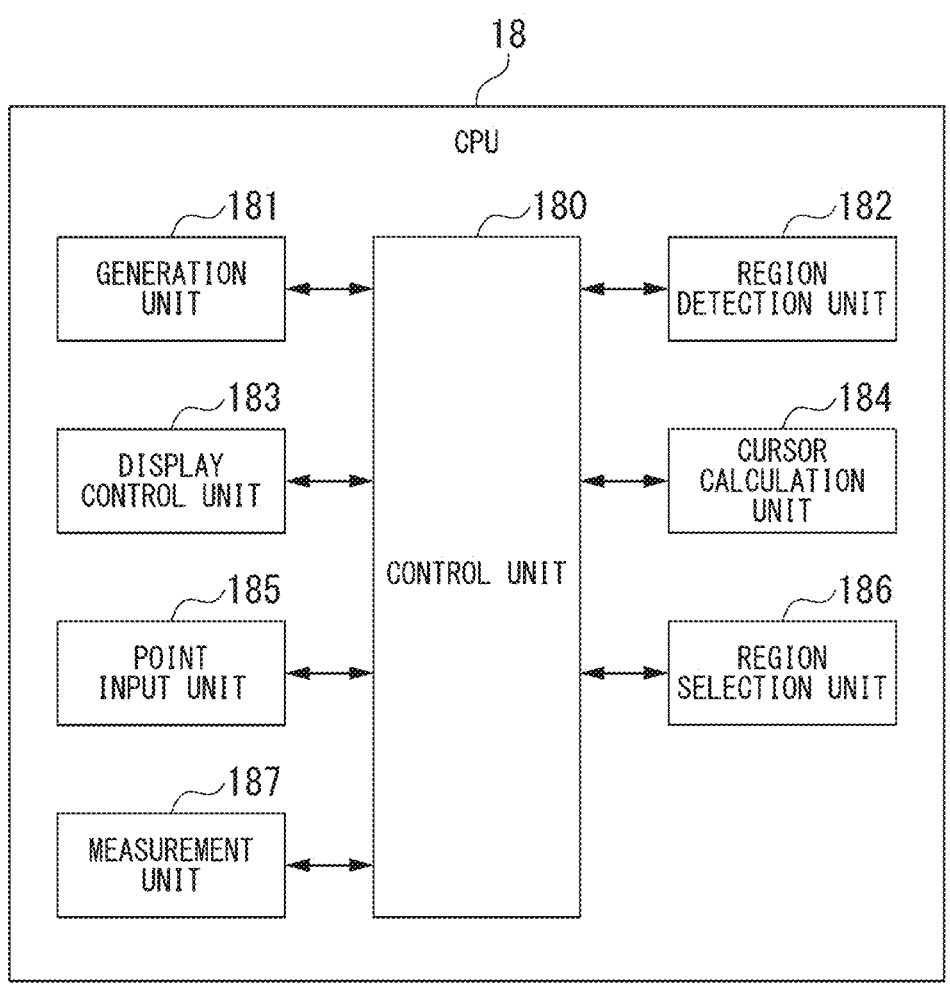
FIG. 12 is a block diagram showing a functional configuration of a CPU included in the endoscope device according to the third embodiment of the present invention.

FIG. 12 shows a functional configuration of the CPU 18. The CPU 18 has functional units including a control unit 180, a generation unit 181, a region detection unit 182, a display control unit 183, a cursor calculation unit 184, a point input unit 185, a region selection unit 186, and a measurement unit 187. At least one of the blocks shown in FIG. 12 may be constituted by a different circuit from the CPU 18.

Each unit shown in FIG. 12 may be constituted by at least one of a processor and a logic circuit. Each unit shown in FIG. 12 may include one or a plurality of processors. Each unit shown in FIG. 12 may include one or a plurality of logic circuits.

The control unit 180 acquires a 2D image (image data) of a subject from the video-signal-processing circuit 12 and controls processing executed by each unit shown in FIG. 12.

The generation unit 181 has the same function as that of the generation unit 70 shown in FIG. 1. The generation unit 181 calculates 3D coordinates of two or more points on a subject on the basis of a 2D image of the subject and generates point-cloud data including the 3D coordinates of the two or more points (generation step). The generation unit 181 can generate the point-cloud data by using the same method as that shown in the first embodiment. In addition, the generation unit 181 generates an image of feature regions. The generation unit 181 may generate a 3D image for displaying the point-cloud data on the display unit 5.

The region detection unit 182 has the same function as that of the region detection unit 71 shown in FIG. 1. The region detection unit 182 detects two or more feature regions on the subject on the basis of the point-cloud data (region detection step). The region detection unit 182 can detect feature regions by using the same method as that shown in the first embodiment.

The display control unit 183 displays the 2D image of the subject acquired by the imaging device 28 and the image of the two or more feature regions generated by the generation unit 181 on the display unit 5. The display control unit 183 displays the image of the two or more feature regions on the display unit 5 so that the two or more feature regions are visually distinguished from each other (image display step). The display control unit 183 may display the 3D image of the point-cloud data on the display unit 5. The display control unit 183 may display the 2D image of the subject on which the image of the feature regions is superimposed on the display unit 5. The display control unit 183 may display the 3D image of the point-cloud data on which the image of the feature regions is superimposed on the display unit 5.

For example, the display control unit 183 controls processing executed by the video-signal-processing circuit 12. The display control unit 183 causes the video signal processed by the video-signal-processing circuit 12 to be output from the video-signal-processing circuit 12 to the display unit 5. The video signal includes color data of each pixel of the 2D image of the subject. The display unit 5 displays the 2D image of the subject on the basis of the video signal output from the video-signal-processing circuit 12. Alternatively, the display control unit 183 outputs a video signal for displaying the image of the feature regions to the display unit 5 via the video-signal-processing circuit 12. The video signal includes color data of each pixel of the image of the feature regions. The display unit 5 displays the image of the feature regions on the basis of the video signal output from the video-signal-processing circuit 12.

Specifically, the display control unit 183 generates a graphic image signal for displaying the image of the feature regions. The display control unit 183 outputs the generated graphic image signal to the video-signal-processing circuit 12. The video-signal-processing circuit 12 combines the video signal output from the CCU 9 and the graphic image signal output from the CPU 18. The video-signal-processing circuit 12 outputs the combined video signal to the display unit 5. The display unit 5 displays the 2D image of the subject and the image of the feature regions.

The display control unit 183 may output a 3D video signal to the display unit 5 via the video-signal-processing circuit 12. The 3D video signal includes color data of each pixel of the 3D image of the point-cloud data. The display unit 5 may display the 3D image of the point-cloud data on the basis of the 3D video signal output from the video-signal-processing circuit 12.

The display control unit 183 displays various kinds of information on the display unit 5. In other words, the display control unit 183 displays various kinds of information on an image. Various kinds of information include a cursor, a measurement result, or the like. The cursor is a mark used by a user to designate a specific point on an image.

For example, the display control unit 183 generates a graphic image signal of various kinds of information. The display control unit 183 outputs the generated graphic image signal to the video-signal-processing circuit 12. The video-signal-processing circuit 12 combines the video signal output from the CCU 9 and the graphic image signal output from the CPU 18. In this way, various kinds of information are superimposed on an image. The video-signal-processing circuit 12 outputs the combined video signal to the display unit 5. The display unit 5 displays an image on which various kinds of information are superimposed.

A user inputs position information of a cursor into the operation unit 4 by operating the operation unit 4. The operation unit 4 outputs the position information input into the operation unit 4 by a user. The position information input into the operation unit 4 is input into the control interface 17 that is an input unit. The position information is output from the control interface 17 to the CPU 18. The cursor calculation unit 184 calculates a position on an image on the basis of the position information input into the operation unit 4. The display control unit 183 displays a cursor at the position calculated by the cursor calculation unit 184.

The point input unit 185 has the same function as that of the point input unit 73 shown in FIG. 1. The point input unit 185 accepts a position on a subject through the operation unit 4. For example, a user moves the cursor to an intended position on the image and performs a predetermined operation. At this time, the point input unit 185 accepts a point corresponding to the position. In a case in which the display unit 5 and the operation unit 4 are constituted as a touch panel, a user inputs a point on the image into the operation unit 4 by touching the screen of the display unit 5. The point input unit 185 accepts the point. The point input unit 185 generates point information indicating the accepted point (point input step).

In a case in which the point input unit 185 accepts a point on the 2D image of the subject, the point information includes coordinates of a pixel corresponding to the point. The coordinates of the pixel are associated with the 3D coordinates in the point-cloud data. In a case in which the point input unit 185 accepts a point on the image of the feature regions, the point information includes coordinates of a pixel corresponding to the point. The coordinates of the pixel are associated with the 3D coordinates in the point-cloud data. In a case in which the point input unit 185 accepts a point on the 3D image of the point-cloud data, the point information includes the 3D coordinates of the point. In a case in which the point input unit 185 accepts a point on the 2D image of the subject on which the image of the feature regions is superimposed, the point information includes coordinates of a pixel corresponding to the point. The coordinates of the pixel are associated with the 3D coordinates in the point-cloud data. In a case in which the point input unit 185 accepts a point on the 3D image of the point-cloud data on which the image of the feature regions is superimposed, the point information includes the 3D coordinates of the point.

The point input unit 185 accepts a reference point and a measurement point. The reference point indicates a reference position for calculating a reference line in the line-based measurement or a reference plane in the plane-based measurement. The measurement point indicates a position at which the size of the subject is measured.

When the point input unit 185 accepts a point on the 2D image of the subject, the point input unit 185 sets the accepted point to the 2D image. When the point input unit 185 accepts a point on the 3D image of the point-cloud data, the point input unit 185 sets the accepted point to the 3D image. When the point input unit 185 accepts a point on the image of the feature regions, the point input unit 185 sets the accepted point to the image. When the point input unit 185 accepts a point on the 2D image of the subject on which the image of the feature regions is superimposed, the point input unit 185 sets the accepted point to the 2D image. When the point input unit 185 accepts a point on the 3D image of the point-cloud data on which the image of the feature regions is superimposed, the point input unit 185 sets the accepted point to the 3D image. The position information of the point set by the point input unit 185 is held on the RAM 14. The point is set by associating the point with a specific image.

The region selection unit 186 selects one of the two or more feature regions detected by the region detection unit 182 as a selected region (region selection step). For example, a user moves the cursor to an intended position on the 2D image of the subject or the 3D image of the point-cloud data by operating the operation unit 4. The position is in a region corresponding to a feature region in which a user intends to designate a point. When the cursor is displayed at the position, a user performs a predetermined operation. At this time, the region selection unit 186 calculates a position on the image of the feature regions corresponding to the position at which the cursor is displayed. Each pixel of the 2D image and each pixel of the 3D image are associated with a pixel of the image of the feature regions. Therefore, the region selection unit 186 can calculate a position on the image of the feature regions corresponding to the position on the 2D image or the 3D image. The region selection unit 186 selects a feature region including the calculated position.

A user may move the cursor to an intended position on the image of the feature regions by operating the operation unit 4. The position is in a feature region in which a user intends to designate a point. When the cursor is displayed at the position, a user performs a predetermined operation. At this time, the region selection unit 186 selects the feature region including the position.

In a case in which the display unit 5 and the operation unit 4 are constituted as a touch panel, a user may input a position on an image into the operation unit 4 by touching the screen of the display unit 5.

The region selection unit 186 may select a feature region that meets a condition set in advance. For example, the region selection unit 186 may select a feature region having the largest area. The region selection unit 186 may calculate the brightness of an image for each feature region and may select a feature region of which the brightness is in a predetermined range. The region selection unit 186 may calculate the contrast for each feature region and may select a feature region of which the contrast is the highest. The region selection unit 186 may select a feature region on the basis of the measurement mode. For example, in a case in which the measurement mode is the line-based measurement, the region selection unit 186 may select a feature region including an edge of the subject. A method of selecting a feature region is not limited to the above-described methods.

The measurement unit 187 has the same function as that of the measurement unit 74 shown in FIG. 1. The measurement unit 187 measures the size of the subject on the basis of the 3D coordinates of two or more points on the subject including the point indicated by the point information (measurement step). Specifically, the measurement unit 187 acquires 3D coordinates of each of the two or more points on the subject. When the point information includes coordinates of a pixel in the 2D image of the subject, the measurement unit 187 acquires 3D coordinates associated with the coordinates of the pixel from the point-cloud data. When the point information includes 3D coordinates of a point in the point-cloud data, the measurement unit 187 acquires the 3D coordinates from the point information. When the point information includes coordinates of a pixel in the image of the feature regions, the measurement unit 187 acquires the 3D coordinates associated with the coordinates of the pixel from the point-cloud data.

The measurement unit 187 executes measurement by using the acquired 3D coordinates. The measurement unit 187 executes at least one of the distance-between-two-points measurement, the line-based measurement, the plane-based measurement, the area measurement, and the perimeter measurement. Measurement executed by the measurement unit 187 is not limited to these. The measurement unit 187 may execute measurement by using 3D coordinates of one or more points accepted by the point input unit 185 and 3D coordinates of one or more points detected in image processing.

Figure 13:
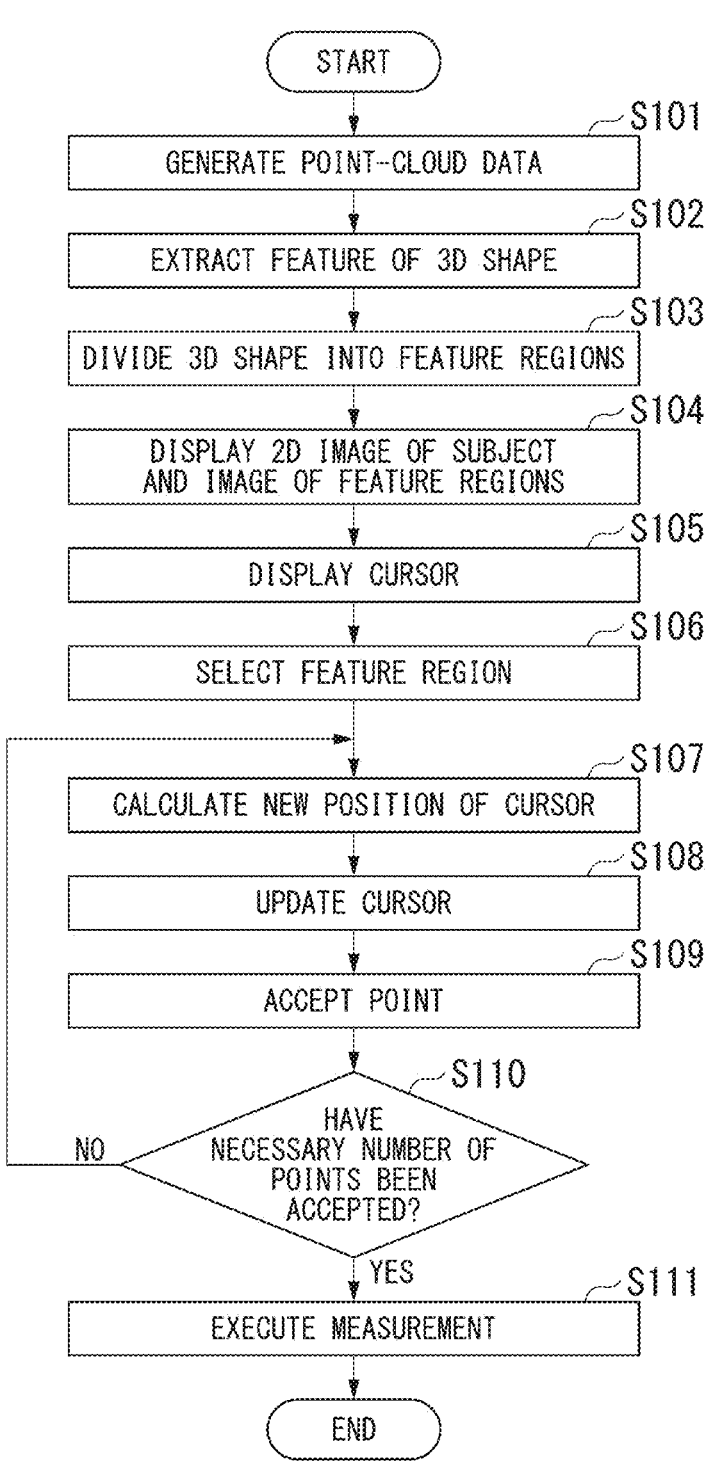
FIG. 13 is a flow chart showing a procedure of three-dimensional measurement in the third embodiment of the present invention.

Three-dimensional measurement in the third embodiment will be described by using FIG. 13. FIG. 13 shows a procedure of the three-dimensional measurement.

The generation unit 181 calculates 3D coordinates of two or more points on a subject on the basis of the 2D image of the subject and generates point-cloud data including the 3D coordinates of the two or more points (Step S101). Step S101 corresponds to the generation step.

After Step S101, the region detection unit 182 extracts a feature of the 3D shape of the subject by using the point-cloud data (Step S102). After Step S102, the region detection unit 182 assigns each point corresponding to the 3D coordinates in the point-cloud data to each of two or more feature regions in accordance with the extracted feature. In this way, the region detection unit 182 divides the 3D shape of the subject into the two or more feature regions (Step S103). Step S102 and Step S103 correspond to the region detection step.

After Step S103, the display control unit 183 displays the 2D image of the subject and the image of the feature regions on the display unit 5 (Step S104). Step S104 corresponds to the image display step.

Figure 14:
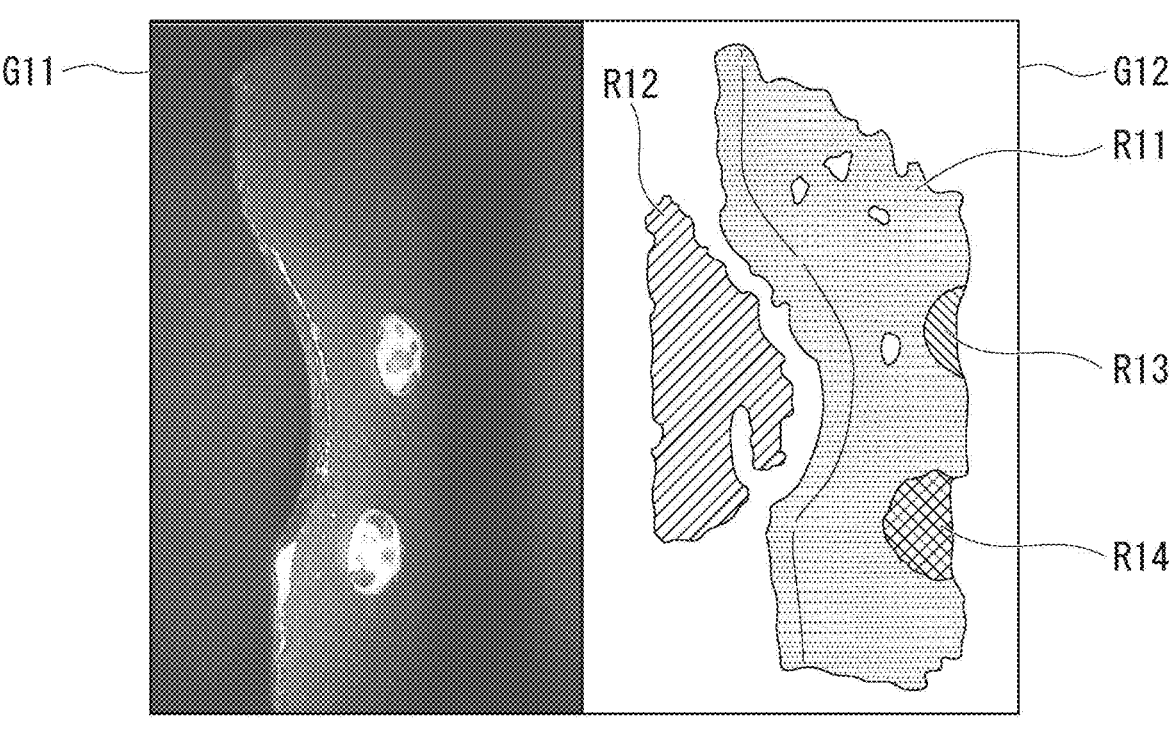
FIG. 14 is a diagram showing an example of an image displayed on a display in the third embodiment of the present invention.

FIG. 14 shows an example of an image displayed on the display unit 5 in Step S104. A 2D image G11 of a subject and an image G12 of feature regions are displayed on the display unit 5. A feature region R11, a feature region R12, a feature region R13, and a feature region R14 are displayed on the image G12. For example, the feature region R11, the feature region R12, the feature region R13, and the feature region R14 are displayed in different colors in the image. A user can visually distinguish the two or more feature regions on the image displayed on the display unit 5 from each other.

Lines showing the borders between the feature region R11, the feature region R12, the feature region R13, and the feature region R14 may be superimposed on the image G12. A character, a symbol, a mark, or the like showing each feature region may be displayed on each feature region.

In the example shown in FIG. 14, the 2D image G11 and the image G12 are arranged in the horizontal direction of the display unit 5. The disposition of the 2D image G11 and the image G12 is not limited to this example. For example, the 2D image G11 and the image G12 may be arranged in the vertical direction of the display unit 5. At this time, the 2D image G11 and the image G12 may rotate by 90 degrees. Part of the 2D image G11 and part of the image G12 may overlap each other.

After Step S104, the display control unit 183 displays a cursor on the 2D image of the subject (Step S105). A user can move the cursor on the 2D image by operating the operation unit 4. The cursor calculation unit 184 calculates a position on the 2D image on the basis of the position information input into the operation unit 4. The display control unit 183 displays a cursor at the position calculated by the cursor calculation unit 184, thus updating the cursor.

Figure 15:
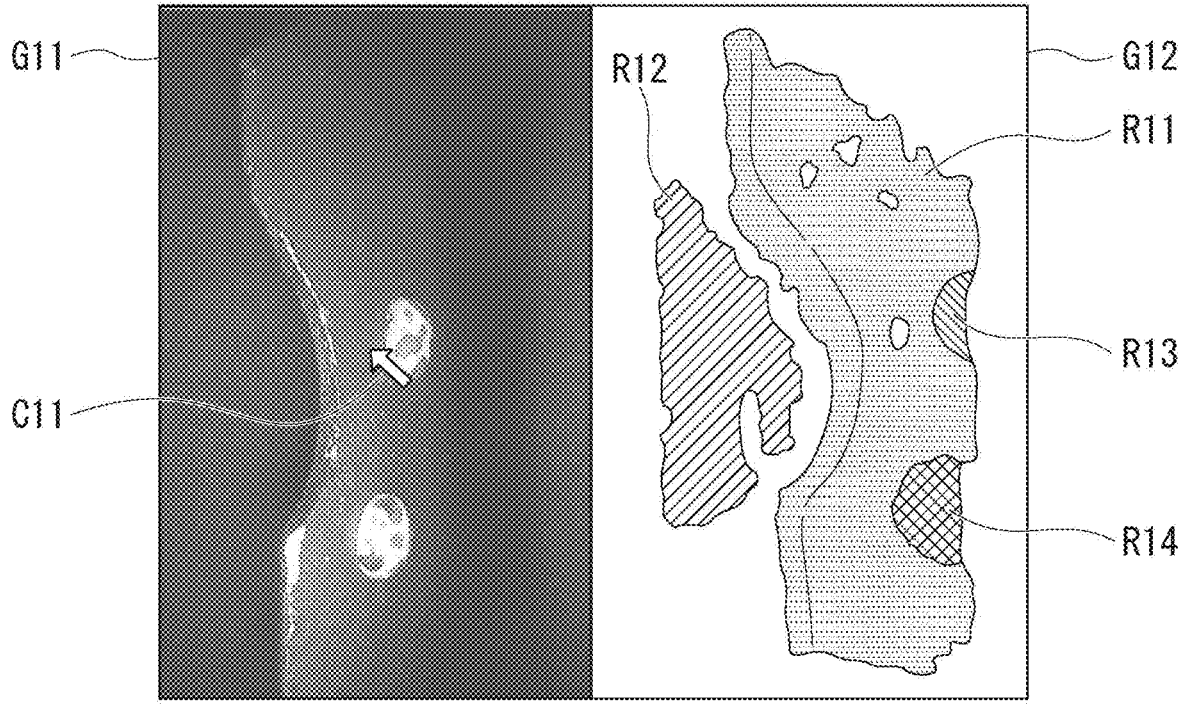
FIG. 15 is a diagram showing an example of an image displayed on the display in the third embodiment of the present invention.

FIG. 15 shows an example of an image displayed on the display unit 5 in Step S105. The same 2D image G11 as that shown in FIG. 14 and the same image G12 as that shown in FIG. 14 are displayed on the display unit 5. A cursor C11 is displayed on the 2D image G11. For example, the cursor C11 is first displayed at a predetermined position on the 2D image G11. The predetermined position is the center or the like of the 2D image G11.

After Step S105, the region selection unit 186 selects one of the two or more feature regions detected by the region detection unit 182 as a selected region (Step S106). Step S106 corresponds to the region selection step.

For example, the region selection unit 186 selects a feature region corresponding to a region including the position of the cursor. Alternatively, the region selection unit 186 selects a feature region that meets a predetermined condition.

Figure 16:
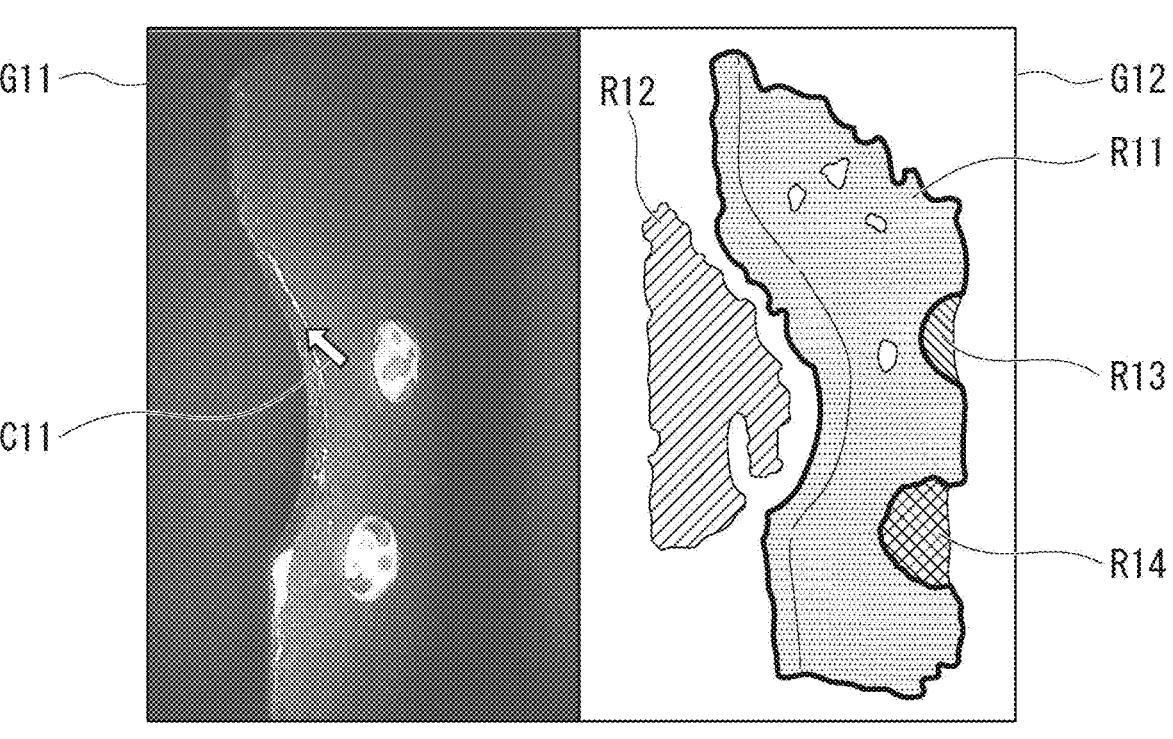
FIG. 16 is a diagram showing an example of an image displayed on the display in the third embodiment of the present invention.

FIG. 16 shows an example of an image displayed on the display unit 5 in Step S106. The same 2D image G11 as that shown in FIG. 14 and the same image G12 as that shown in FIG. 14 are displayed on the display unit 5. The same cursor C11 as that shown in FIG. 15 is displayed on the 2D image G11. A user moves the cursor C11 on the 2D image G11. When a user performs a predetermined operation, the region selection unit 186 calculates a position on the image G12 corresponding to the position of the cursor C11. The region selection unit 186 selects a feature region including the calculated position.

In the example shown in FIG. 16, the cursor C11 is at a position on the 2D image G11 corresponding to a position in the feature region R11 when a user performs a predetermined operation. Therefore, the region selection unit 186 selects the feature region R11 as a selected region.

The display control unit 183 highlights the feature region R11, which is the selected region, in Step S106. Step S106 corresponds to the image display step. In the example shown in FIG. 16, the feature region R11 is surrounded by a thick line. The line is included in the graphic image signal generated by the display control unit 183. The feature region R12, the feature region R13, and the feature region R14 are not highlighted.

A color or a pattern that draws a user's attention may be added to the feature region R11. A character, a symbol, a mark, or the like showing the selected region may be displayed on the feature region R11. A method of highlighting the selected region is not limited to the above-described methods. Since the selected region is highlighted, a user can easily confirm a region on the 2D image G11 on which a point should be designated.

The display control unit 183 may display only the feature region R11, which is the selected region, in Step S106. In this case, the feature region R12, the feature region R13, and the feature region R14 are not displayed. Since only the selected region is displayed, a user can easily confirm a region on the 2D image G11 on which a point should be designated.

The display control unit 183 may display the selected region in a first color in Step S106 and may display a feature region different from the selected region in a second color different from the first color in Step S106. For example, the feature region R11 is displayed in a color such as red, and the feature region R12, the feature region R13, and the feature region R14 are displayed in a color such as gray. The feature region R12, the feature region R13, and the feature region R14 are displayed in the same color. Since the selected region and each of the other feature regions are displayed in different colors, a user can easily confirm a region on the 2D image G11 on which a point should be designated.

After Step S106, the cursor calculation unit 184 calculates a position on the 2D image of the subject on the basis of the position information input into the operation unit 4 (Step S107). After Step S107, the display control unit 183 displays the cursor at the position calculated by the cursor calculation unit 184, thus updating the cursor (Step S108).

After Step S108, the point input unit 185 accepts one point on the 2D image of the subject through the operation unit 4 and generates point information indicating the accepted point (Step S109). Step S109 corresponds to the point input step.

Figure 17:
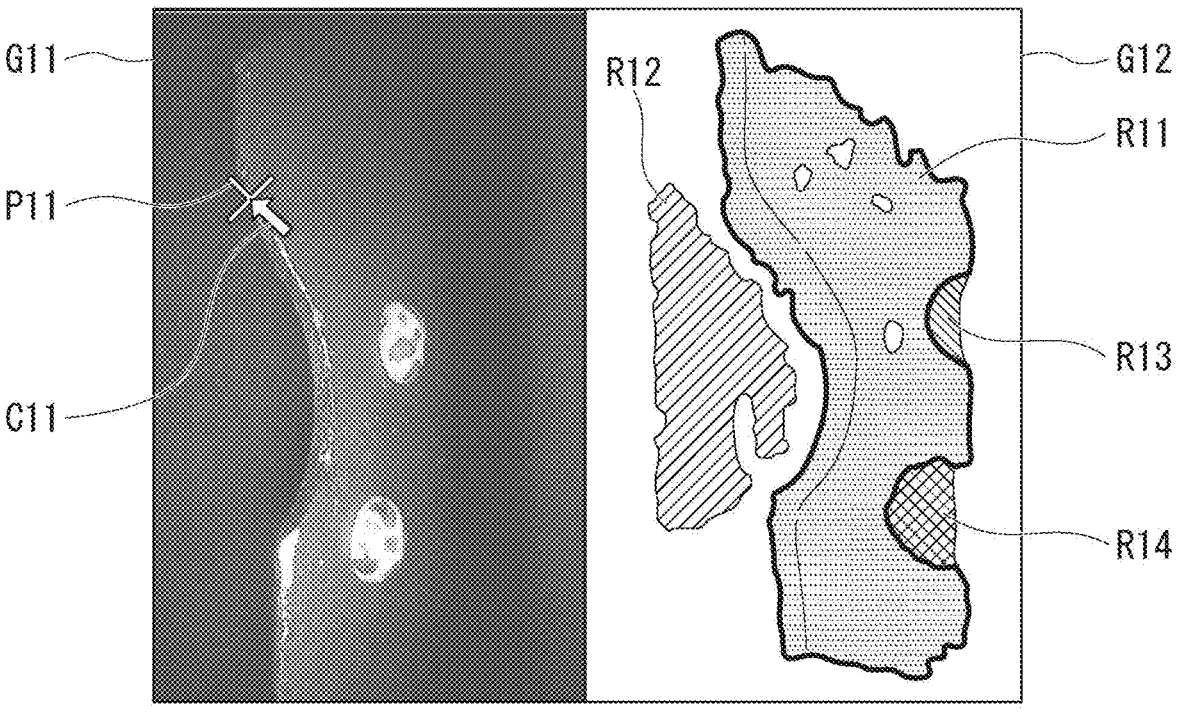
FIG. 17 is a diagram showing an example of an image displayed on the display in the third embodiment of the present invention.

FIG. 17 shows an example of an image displayed on the display unit 5 in Step S109. The same 2D image G11 as that shown in FIG. 14 and the same image G12 as that shown in FIG. 14 are displayed on the display unit 5. The same cursor C11 as that shown in FIG. 15 is displayed on the 2D image G11. A user moves the cursor C11 to an intended position on the 2D image G11 and performs a predetermined operation. At this time, the point input unit 185 accepts a point corresponding to the position.

In the example shown in FIG. 17, the point input unit 185 accepts a point P11. A mark showing the point P11 is displayed on the 2D image G11. The mark indicating the point accepted by the point input unit 185 does not need to be displayed. In the example shown in FIG. 17, a user designates a point on the 2D image G11 corresponding to a position in the feature region R11 by referring to the image G12. Therefore, a user can easily designate a point on a region corresponding to a feature region intended by the user. The display control unit 183 may display a point corresponding to the point accepted by the point input unit 185 on the image G12.

After the point input unit 185 accepts a point, the point may be corrected. For example, a user may determine that the point designated by the user is wrong and may input an instruction to correct the point into the operation unit 4. In this case, a user inputs a new point into the operation unit 4. The point input unit 185 accepts the instruction and the new point. The point input unit 185 updates the point, which is directed to be corrected, with the new point.

After Step S109, the control unit 180 determines whether or not the point input unit 185 has accepted a necessary number of points (Step S110). Two measurement points are necessary for the distance-between-two-points measurement. Three points including two reference points and one measurement point are necessary for the line-based measurement. Four or more points including three or more reference points and one measurement point are necessary for the plane-based measurement. Three or more measurement points are necessary for the area measurement and the perimeter measurement.

When the control unit 180 determines that the point input unit 185 has not accepted the necessary number of points in Step S110, Step S107 is executed. Thereafter, Step S108 and Step S109 are executed again. Therefore, the point input unit 185 accepts two or more points.

Figure 18:
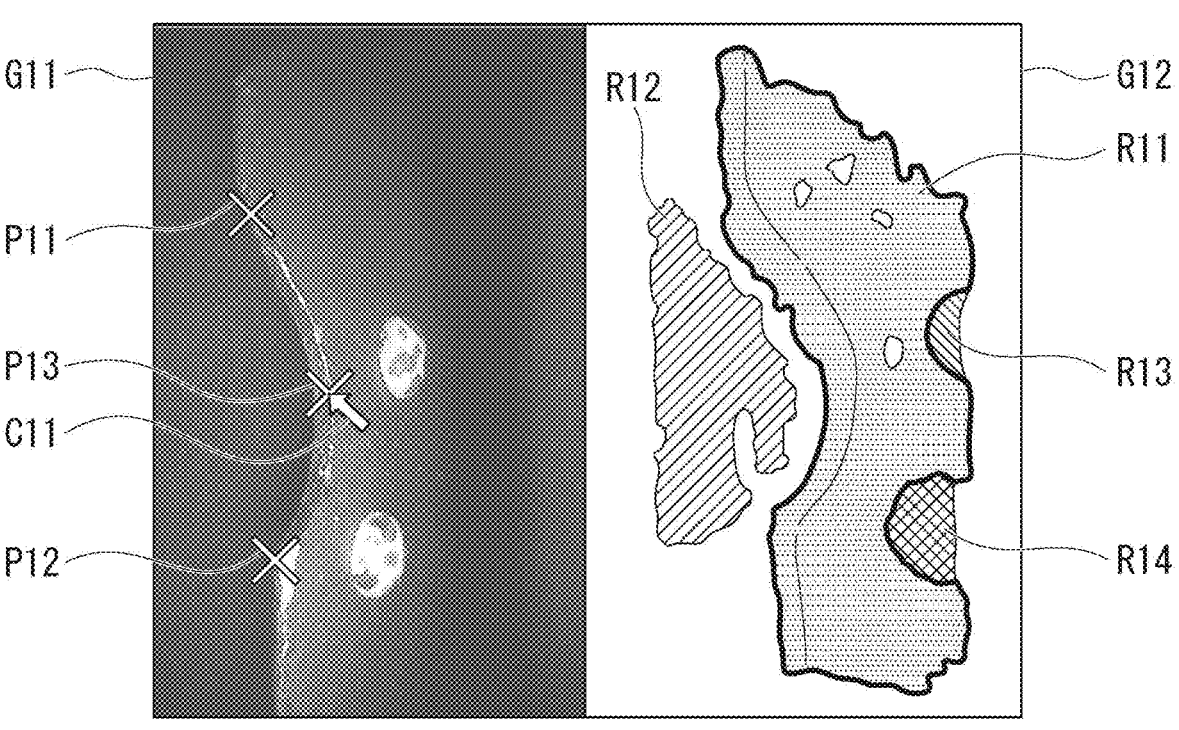
FIG. 18 is a diagram showing an example of an image displayed on the display in the third embodiment of the present invention.

FIG. 18 shows an example of an image displayed on the display unit 5 after Step S109 is executed twice or more. The same 2D image G11 as that shown in FIG. 14 and the same image G12 as that shown in FIG. 14 are displayed on the display unit 5. The same cursor C11 as that shown in FIG. 15 is displayed on the 2D image G11. In FIG. 18, an example of the line-based measurement is shown, and the point input unit 185 accepts three points on the 2D image G11. After the point P11 is designated, a user moves the cursor C11 and sequentially designates a point P12 and a point P13. The point input unit 185 accepts the point P11 in Step S109 for the first time. Thereafter, the point input unit 185 accepts the point P12 in Step S109 for the second time and accepts the point P13 in Step S109 for the third time.

Before the point input unit 185 accepts the point P13, the control unit 180 determines that the point input unit 185 has not accepted the necessary number of points in Step S110. After the point input unit 185 accepts the point P13, the control unit 180 determines that the point input unit 185 has accepted the necessary number of points in Step S110.

When the control unit 180 determines that the point input unit 185 has accepted the necessary number of points in Step S110, the measurement unit 187 measures the size of the subject on the basis of the 3D coordinates of two or more points on the subject including the point indicated by the point information (Step S111). Step S111 corresponds to the measurement step. When Step S111 is executed, the three-dimensional measurement is completed.

After Step S111 is executed, the display control unit 183 may display a measurement result on the display unit 5. The measurement result is included in the graphic image signal generated by the display control unit 183.

Figure 19:
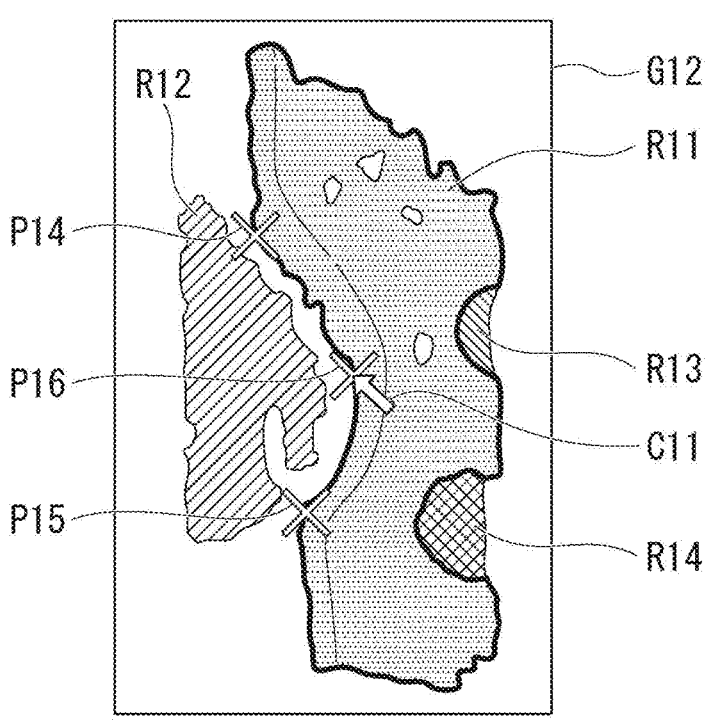
FIG. 19 is a diagram showing an example of an image displayed on the display in the third embodiment of the present invention.

FIG. 19 shows another example of an image displayed on the display unit 5. In the example shown in FIG. 19, the 2D image of the subject is not displayed in Step S104. The same image G12 as that shown in FIG. 14 is displayed on the display unit 5. The same cursor C11 as that shown in FIG. 15 is displayed on the image G12. When a position on the image G12 is accepted through the operation unit 4 in Step S106, the region selection unit 186 selects a feature region corresponding to the position in Step S106. In FIG. 19, an example in which the feature region R11 is selected is shown, and the feature region R11 is highlighted. In FIG. 19, an example of the line-based measurement is shown, and the point input unit 185 accepts three points on the image G12. A user moves the cursor C11 and sequentially designates a point P14, a point P15, and a point P16. The point input unit 185 accepts the point P14, the point P15, and the point P16.

In the examples shown in FIGS. 13 to 18, the 2D image of the subject and the image of the feature regions are displayed on the display unit 5, and the 2D image is used for inputting a point. In the example shown in FIG. 19, the image of the feature regions is displayed on the display unit 5, and the image is used for inputting a point. A combination of an image displayed on the display unit 5 and an image used for inputting a point is not limited to these examples.

The 2D image of the subject may be displayed on the display unit 5, and a point on the 2D image may be input into the operation unit 4. The 3D image of the point-cloud data may be displayed on the display unit 5, and a point on the 3D image may be input into the operation unit 4.

The image of the feature regions and the 2D image of the subject may be displayed on the display unit 5, and a point on the image of the feature regions may be input into the operation unit 4. The image of the feature regions and the 3D image of the point-cloud data may be displayed on the display unit 5, and a point on the 3D image may be input into the operation unit 4. The image of the feature regions and the 3D image of the point-cloud data may be displayed on the display unit 5, and a point on the image of the feature regions may be input into the operation unit 4.

The 2D image of the subject on which the image of the feature regions is superimposed may be displayed on the display unit 5, and a point on the 2D image may be input into the operation unit 4. The 3D image of the point-cloud data on which the image of the feature regions is superimposed may be displayed on the display unit 5, and a point on the 3D image may be input into the operation unit 4.

The 3D image of the point-cloud data on which the image of the feature regions is superimposed and the 2D image of the subject may be displayed on the display unit 5, and a point on the 2D image may be input into the operation unit 4. The 3D image of the point-cloud data on which the image of the feature regions is superimposed and the 2D image of the subject may be displayed on the display unit 5, and a point on the 3D image may be input into the operation unit 4.

The 2D image of the subject on which the image of the feature regions is superimposed and the 3D image of the point-cloud data may be displayed on the display unit 5, and a point on the 3D image may be input into the operation unit 4. The 2D image of the subject on which the image of the feature regions is superimposed and the 3D image of the point-cloud data may be displayed on the display unit 5, and a point on the 2D image may be input into the operation unit 4.

In a case in which the display unit 5 and the operation unit 4 are constituted as a touch panel, a user can input a point into the operation unit 4 by touching the screen of the display unit 5. Therefore, the cursor does not need to be displayed. Accordingly, Step S105, Step S107, and Step S108 do not need to be executed. The CPU 18 does not need to have the function of the cursor calculation unit 184.

The feature regions shown in FIG. 16 do not need to be highlighted. Accordingly, Step S106 does not need to be executed. The CPU 18 does not need to have the function of the region selection unit 186.

The order of processing in the three-dimensional measurement is not limited to that shown in FIG. 13. For example, the 2D image of the subject may be displayed on the display unit 5 before Step S101, Step S102, or Step S103 is executed. In a case in which the 3D image of the point-cloud data is used instead of the 2D image of the subject, the 3D image may be displayed on the display unit 5 before Step S102 or Step S103 is executed.

In the third embodiment, the endoscope device 1 displays the image of the two or more feature regions on the display unit 5. A user can easily designate a point in a feature region intended by the user by referring to the image displayed on the display unit 5. Therefore, the endoscope device 1 can support correct designation of a point on the subject.

Fourth Embodiment

A fourth embodiment of the present invention will be described. In the fourth embodiment, only a point in one selected region is valid, and the 3D coordinates of the valid point are used for measurement.

Figure 20:
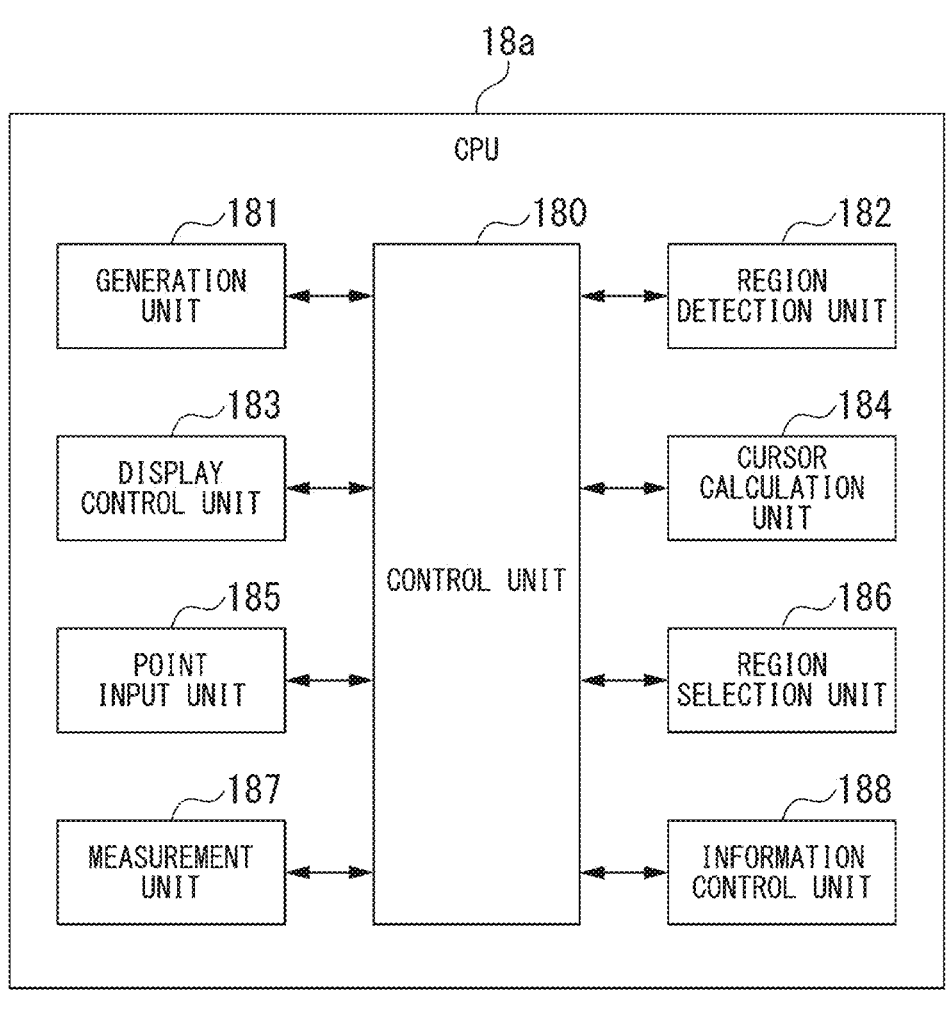
FIG. 20 is a block diagram showing a functional configuration of a CPU included in an endoscope device according to a fourth embodiment of the present invention.

In the fourth embodiment, the CPU 18 shown in FIG. 12 is changed to a CPU 18a shown in FIG. 20. FIG. 20 shows a functional configuration of the CPU 18a. The CPU 18a has functional units including a control unit 180, a generation unit 181, a region detection unit 182, a display control unit 183, a cursor calculation unit 184, a point input unit 185, a region selection unit 186, the measurement unit 187, and an information control unit 188. At least one of the blocks shown in FIG. 20 may be constituted by a different circuit from the CPU 18a. The same configuration as that shown in FIG. 12 will not be described.

Each unit shown in FIG. 20 may be constituted by at least one of a processor and a logic circuit. Each unit shown in FIG. 20 may include one or a plurality of processors. Each unit shown in FIG. 20 may include one or a plurality of logic circuits.

The region detection unit 182 detects one or more feature regions on a subject on the basis of the point-cloud data. The region detection unit 182 in the third embodiment detects two or more feature regions, but the region detection unit 182 in the fourth embodiment may detect one feature region. In a case in which the region detection unit 182 detects one feature region, the region detection unit 182 assigns all the points in the point-cloud data to the feature region.

The information control unit 188 executes the first control. The information control unit 188 controls the point information generated by the point input unit 185 so that the point information indicates a point in one of the one or more feature regions.

The region selection unit 186 selects one of the one or more feature regions detected by the region detection unit 182 as a selected region (region selection step). When the region detection unit 182 detects two or more feature regions, the region selection unit 186 selects one of the two or more feature regions as a selected region. When the region detection unit 182 detects only one feature region, the region selection unit 186 selects the feature region. Only when the point input unit 185 accepts a point in the selected region, the information control unit 188 validates the point information indicating the point (information control step). The measurement unit 187 measures the size of the subject on the basis of the 3D coordinates of two or more points including the point indicated by the valid point information.

The measurement unit 187 uses the 3D coordinates of one or more points indicated by the valid point information. It is not necessary that the point information of all the two or more points used by the measurement unit 187 be valid. The point information of some of the two or more points used by the measurement unit 187 may be invalid. For example, in a case in which the plane-based measurement is executed, only the point information of three reference points defining a reference plane may be valid, and the point information of one measurement point may be invalid. Alternatively, the point information of one measurement point may be valid regardless of the position of the measurement point.

The region selection unit 186 may select one of the two or more feature regions detected by the region detection unit 182 as a first selected region and may select one of the one or more feature regions other than the first selected region as a second selected region. Only when the point input unit 185 accepts a point in the first selected region or the second selected region, the information control unit 188 may validate the point information indicating the point. For example, in a case in which the plane-based measurement is executed, the point input unit 185 may accept three reference points in the first selected region and may accept one measurement point in the second selected region.

Figure 21:
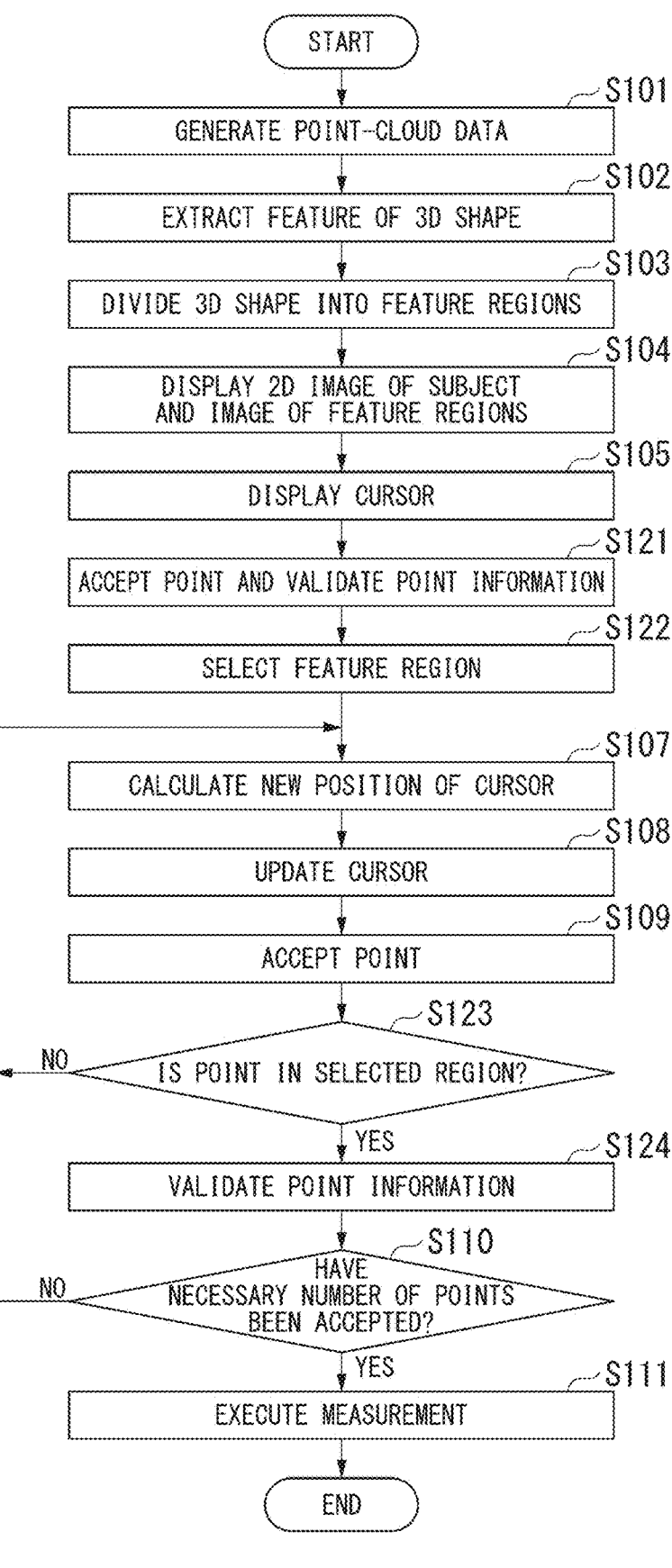
FIG. 21 is a flow chart showing a procedure of three-dimensional measurement in the fourth embodiment of the present invention.

Three-dimensional measurement in the fourth embodiment will be described by using FIG. 21. FIG. 21 shows a procedure of the three-dimensional measurement. The same processing as that shown in FIG. 13 will not be described.

After Step S105, the point input unit 185 accepts one point on the 2D image of the subject through the operation unit 4 and generates point information indicating the accepted point. The information control unit 188 validates the point information (Step S121). Step S121 corresponds to the point input step.

For example, the information control unit 188 generates information indicating that the point information is valid and adds the generated information to the point information. The information control unit 188 may manage a table including the point information and the information indicating that the point information is valid.

After Step S121, the region selection unit 186 detects a position on the image of the feature regions corresponding to the point accepted in Step S121. The region selection unit 186 selects a feature region including the position as a selected region (Step S122). Step S122 corresponds to the region selection step.

Each pixel of the 2D image of the subject is associated with a pixel of the image of the feature regions. Therefore, the region selection unit 186 can calculate a position on the image of the feature regions corresponding to a position on the 2D image of the subject. The region selection unit 186 selects a feature region including the calculated position. After Step S122, Step S107 is executed.

After Step S109, the information control unit 188 calculates a position on the image of the feature regions corresponding to the point accepted in Step S109. The information control unit 188 can calculate a position on the image of the feature regions corresponding to a position on the 2D image of the subject. The information control unit 188 determines whether or not the calculated position is in the selected region (Step S123). Points on the borders between the selected region and other feature regions are dealt as points in the selected region. Points on the borders between the selected region and other feature regions may be dealt as points outside the selected region.

When the information control unit 188 determines that the point is not in the selected region in Step S123, Step S107 is executed. In such a case, the point information of the point is invalid. The information control unit 188 may discard the point information of the point. The display control unit 183 may display information indicating that the accepted point is invalid on the display unit 5. In this way, the endoscope device 1 can encourage a user to designate a valid point.

When the information control unit 188 determines that the point is in the selected region in Step S123, the information control unit 188 makes the point information of the point valid (Step S124). Step S124 corresponds to the information control step. A method of validating the point information is similar to that in Step S121. After Step S124, Step S110 is executed.

The measurement unit 187 measures the size of the subject on the basis of the 3D coordinates of only the point indicated by the valid point information. The point indicated by the valid point information is in the selected region. Since the point in the selected region is used for measurement, the endoscope device 1 can avoid using a point that is not intended by a user.

Figure 22:
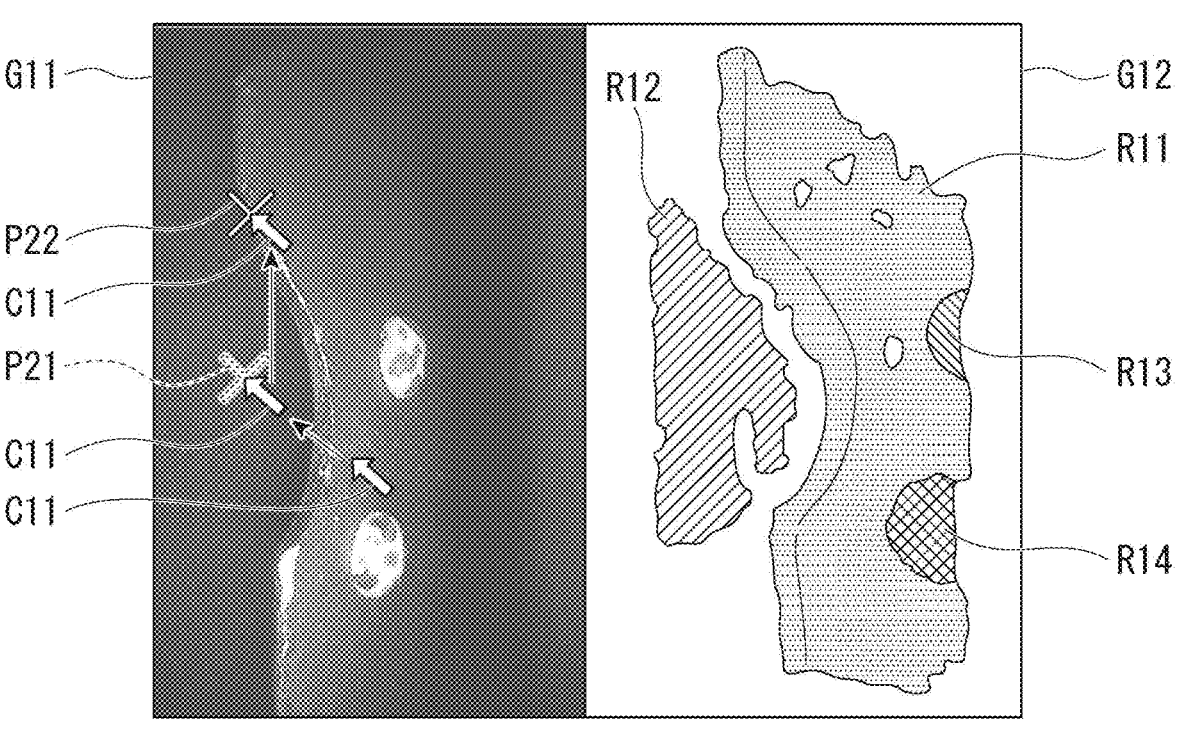
FIG. 22 is a diagram showing an example of an image displayed on a display in the fourth embodiment of the present invention.

FIG. 22 shows an example of an image displayed on the display unit 5. The same 2D image G11 as that shown in FIG. 14 and the same image G12 as that shown in FIG. 14 are displayed on the display unit 5. The same cursor C11 as that shown in FIG. 15 is displayed on the 2D image G11. FIG. 22 shows a state after the feature region R11 is selected in Step S122.

A user moves the cursor C11 and designates a point on the 2D image G11. For example, a user designates a point P21, and the point input unit 185 accepts the point P21. The point P21 corresponds to a point in the feature region R12. The information control unit 188 determines that a point on the image G12 corresponding to the point P21 is not in the feature region R11 in Step S123. Therefore, the point information of the point P21 is invalid, and the measurement unit 187 does not use the 3D coordinates of the point P21 for measurement.

Thereafter, a user designates a point P22, and the point input unit 185 accepts the point P22. The point P22 corresponds to a point in the feature region R11. The information control unit 188 determines that a point on the image G12 corresponding to the point P22 is in the feature region R11 in Step S123. Therefore, the information control unit 188 validates the point information of the point P22 in Step S124. The measurement unit 187 uses the 3D coordinates of the point P22 for measurement.

Figure 23:
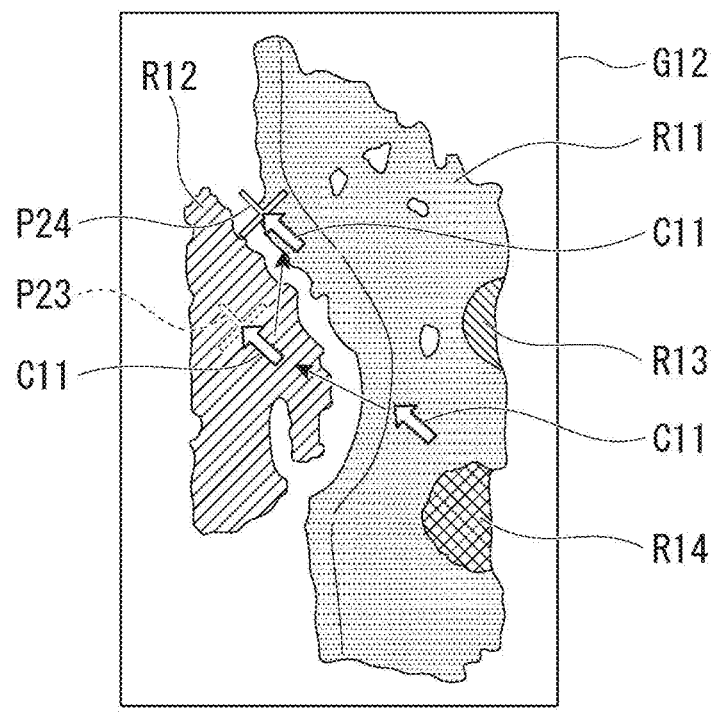
FIG. 23 is a diagram showing an example of an image displayed on the display in the fourth embodiment of the present invention.

FIG. 23 shows another example of an image displayed on the display unit 5. In the example shown in FIG. 23, the 2D image of the subject is not displayed in Step S104. The same image G12 as that shown in FIG. 14 is displayed on the display unit 5. The same cursor C11 as that shown in FIG. 15 is displayed on the image G12. When a position on the image G12 is accepted through the operation unit 4 in Step S121, the region selection unit 186 selects a feature region corresponding to the position in Step S122. FIG. 23 shows a state after the feature region R11 is selected in Step S122.

A user moves the cursor C11 and designates a point on the image G12. For example, a user designates a point P23, and the point input unit 185 accepts the point P23. The point P23 is in the feature region R12. The information control unit 188 determines that the point P23 is not in the feature region R11 in Step S123. Therefore, the point information of the point P23 is invalid, and the measurement unit 187 does not use the 3D coordinates of the point P23 for measurement.

Thereafter, a user designates a point P24, and the point input unit 185 accepts the point P24. The point P24 is in the feature region R11. The information control unit 188 determines that the point P24 is in the feature region R11 in Step S123. Therefore, the information control unit 188 validates the point information of the point P24 in Step S124. The measurement unit 187 uses the 3D coordinates of the point P24 for measurement.

There is a case in which the point input unit 185 accepts a point in a region (background) that is not any of the feature region R11, the feature region R12, the feature region R13, and the feature region R14. In such a case, the information control unit 188 determines that the point is not in the feature region R11 in Step S123. Therefore, the point information of the point is invalid, and the measurement unit 187 does not use the 3D coordinates of the point for measurement.

In the three-dimensional measurement shown in FIG. 21, when the point input unit 185 accepts a first point on the subject in Step S121, the region selection unit 186 selects a feature region including the first point as a selected region in Step S122. When the point input unit 185 accepts a second point in the selected region in Step S109, the measurement unit 187 measures the size of the subject on the basis of the 3D coordinates of two or more points including the first point and the second point in Step S111. The second point is different from the first point. In a case in which the point input unit 185 accepts three or more points, the three or more points include the first point and the second point described above. Since two or more points in the selected region are used for measurement, the endoscope device 1 can avoid using a point that is not intended by a user.

In the example shown in FIG. 22, the 2D image of the subject and the image of the feature regions are displayed on the display unit 5, and the 2D image is used for inputting a point. In the example shown in FIG. 23, the image of the feature regions is displayed on the display unit 5, and the image is used for inputting a point. A combination of an image displayed on the display unit 5 and an image used for inputting a point is not limited to these examples. The combination is similar to that in the third embodiment. In the fourth embodiment, the image of the feature regions does not need to be displayed.

In the three-dimensional measurement shown in FIG. 21, the measurement unit 187 uses the point accepted in Step S121 for measurement. The point may be used only for selecting a feature region. The measurement unit 187 does not need to use the point for measurement.

The display control unit 183 may highlight the selected region in Step S122. Alternatively, the display control unit 183 may display only the selected region on the display unit 5 in Step S122.

In a case in which the display unit 5 and the operation unit 4 are constituted as a touch panel, the cursor does not need to be displayed. Accordingly, Step S105, Step S107, and Step S108 do not need to be executed. The CPU 18 does not need to have the function of the cursor calculation unit 184.

The order of processing in the three-dimensional measurement is not limited to that shown in FIG. 21. For example, the 2D image of the subject may be displayed on the display unit 5 before Step S101, Step S102, or Step S103 is executed. In a case in which the 3D image of the point-cloud data is used instead of the 2D image of the subject, the 3D image may be displayed on the display unit 5 before Step S102 or Step S103 is executed.

In the fourth embodiment, the endoscope device 1 executes the first control. In the first control, the point information is controlled so that the point information indicates a point in the selected region. The endoscope device 1 uses the 3D coordinates of the point in the selected region for measurement. Therefore, the endoscope device 1 can support correct designation of a point on the subject. A user can easily designate a point on the border of the selected region.

Fifth Embodiment

A fifth embodiment of the present invention will be described. The endoscope device 1 according to the fifth embodiment includes the CPU 18 shown in FIG. 12. In the fifth embodiment, the position of a mark on an image is restricted to a position in one feature region.

The display control unit 183 and the cursor calculation unit 184 execute the second control. The display control unit 183 displays a mark on an image. The cursor calculation unit 184 restricts the position of the mark to a position in a region corresponding to one of one or more feature regions.

The display control unit 183 displays one of the 3D image of the point-cloud data and the 2D image of the subject on the display unit 5 (image display step). The region selection unit 186 selects one of the one or more feature regions detected by the region detection unit 182 as a selected region (region selection step). In a case in which the region detection unit 182 detects two or more feature regions, the region selection unit 186 selects one of the two or more feature regions as a selected region. In a case in which the region detection unit 182 detects only one feature region, the region selection unit 186 selects the feature region. The display control unit 183 displays a mark on one of the 3D image of the point-cloud data and the 2D image of the subject (mark display step). The cursor calculation unit 184 calculates a position at which the mark is displayed on the basis of the information accepted through the operation unit 4 (position calculation step). The position at which the mark is displayed is restricted to a position in a region corresponding to the selected region. The point input unit 185 accepts a point corresponding to the position of the mark (point input step).

The display control unit 183 may display the mark on the image of the one or more feature regions (mark display step). In a case in which the mark is displayed on the image of the feature regions, the display control unit 183 does not need to display the 3D image of the point-cloud data and the 2D image of the subject on the display unit 5.

The region selection unit 186 may select one of the two or more feature regions detected by the region detection unit 182 as a first selected region and may select one of the one or more feature regions other than the first selected region as a second selected region. The position at which the mark is displayed may be restricted to a position in a region corresponding to the first selected region or the second selected region. For example, in a case in which the plane-based measurement is executed, the position of the mark may be restricted to a position in a region corresponding to the first selected region, and the point input unit 185 may accept three reference points in the first selected region. Thereafter, the position of the mark may be restricted to a position in a region corresponding to the second selected region, and the point input unit 185 may accept one measurement point in the second selected region.

Figure 24:
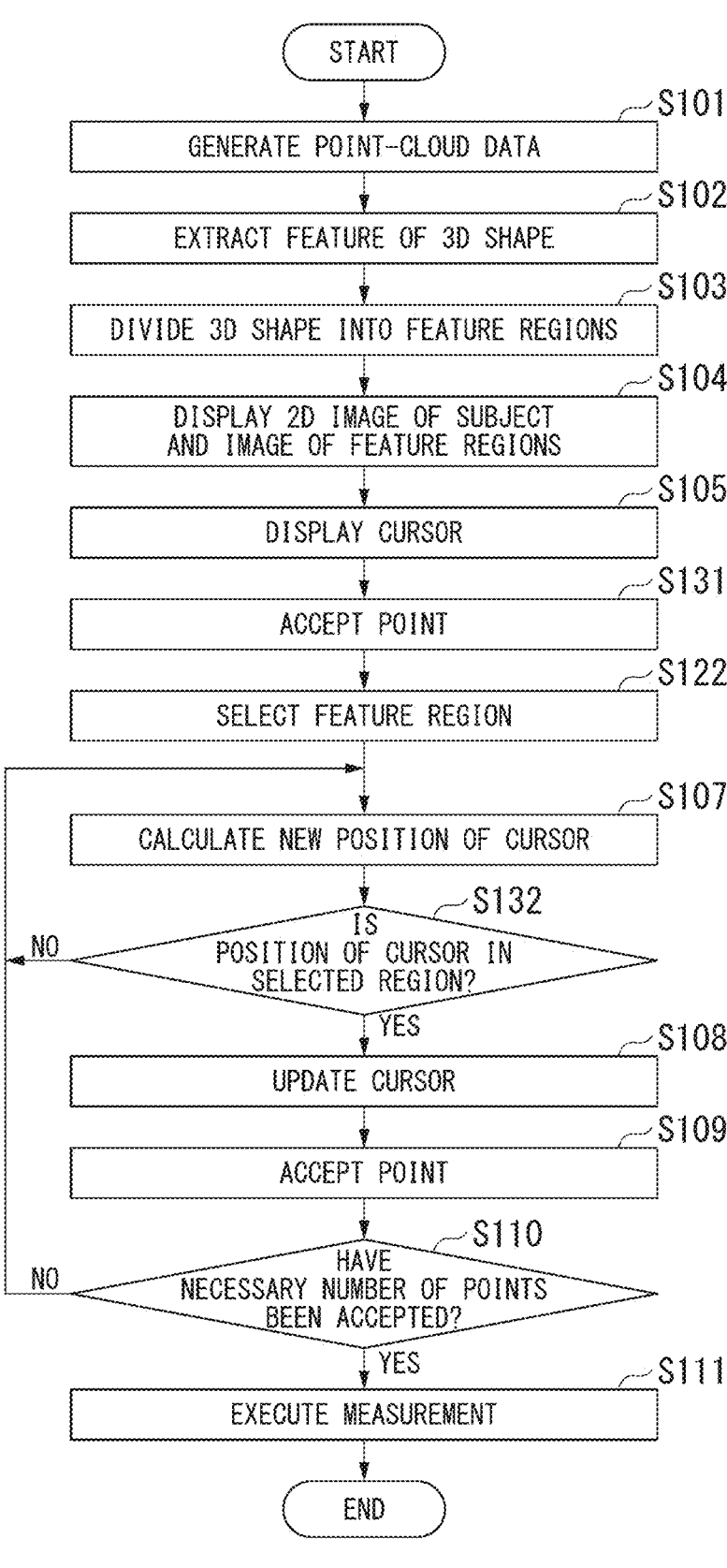
FIG. 24 is a flow chart showing a procedure of three-dimensional measurement in a fifth embodiment of the present invention.

Three-dimensional measurement in the fifth embodiment will be described by using FIG. 24. FIG. 24 shows a procedure of the three-dimensional measurement. The same processing as that shown in FIG. 13 and FIG. 21 will not be described.

The display control unit 183 displays the 2D image of the subject and the image of the feature regions on the display unit 5 in Step S104. After Step S105, the point input unit 185 accepts one point on the 2D image of the subject through the operation unit 4 and generates point information indicating the accepted point (Step S131). Step S131 corresponds to the point input step.

After Step S131, the region selection unit 186 selects one feature region as a selected region in Step S122. The cursor calculation unit 184 calculates a position on the 2D image of the subject on the basis of the position information input into the operation unit 4 in Step S107. Step S107 corresponds to the position calculation step.

After Step S107, the cursor calculation unit 184 calculates a position on the image of the feature regions corresponding to the position calculated in Step S107. Each pixel of the 2D image of the subject is associated with a pixel of the image of the feature regions. Therefore, the cursor calculation unit 184 can calculate a position on the image of the feature regions corresponding to a position on the 2D image of the subject. The cursor calculation unit 184 determines whether or not the calculated position is in the selected region (Step S132). Points on the borders between the selected region and other feature regions are dealt as points in the selected region. Points on the borders between the selected region and other feature regions may be dealt as points outside the selected region.

When the cursor calculation unit 184 determines that the position is not in the selected region in Step S132, Step S107 is executed. When the cursor calculation unit 184 determines that the position is in the selected region in Step S132, the display control unit 183 displays a cursor at the position in Step S108. Step S108 corresponds to the mark display step. The cursor is displayed in a region of the 2D image corresponding to the selected region. A user can move the cursor only in the region.

The point input unit 185 accepts a point in the region of the 2D image corresponding to the selected region in Step S109. The measurement unit 187 measures the size of the subject on the basis of the 3D coordinates of only a point in the region of the 2D image corresponding to the selected region in Step S111. Since the point in the selected region is used for measurement, the endoscope device 1 can avoid using a point that is not intended by a user.

Figure 25:
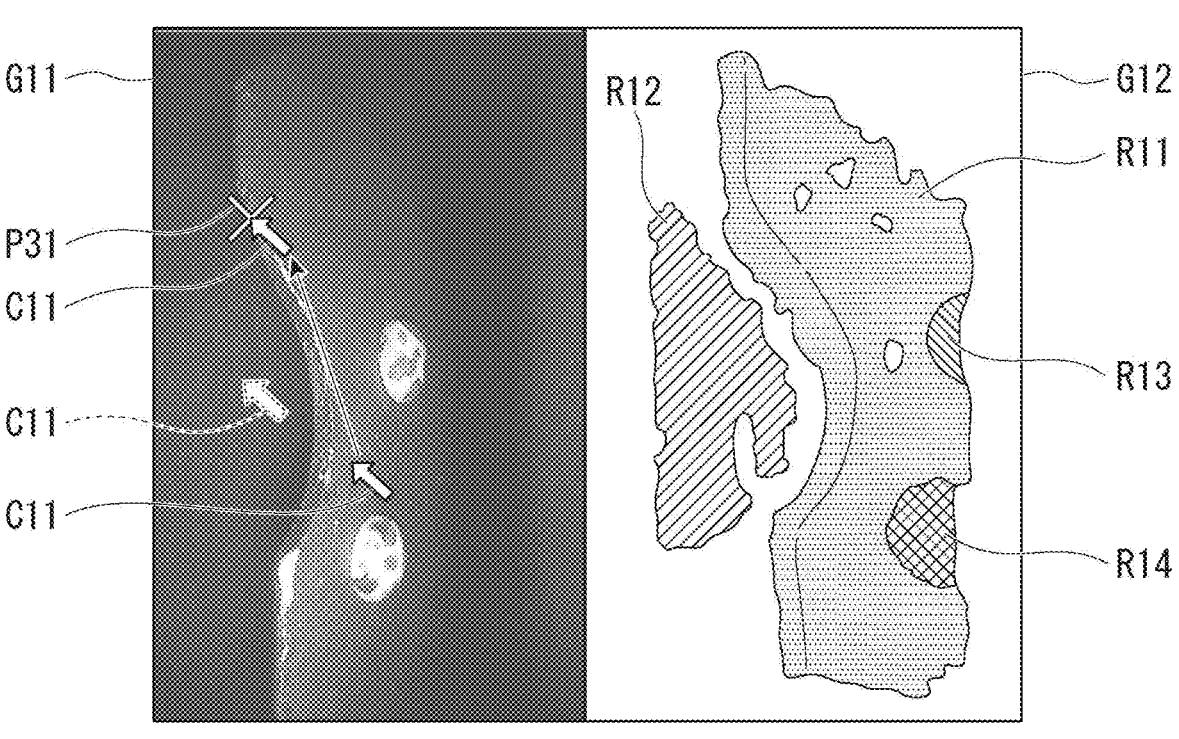
FIG. 25 is a diagram showing an example of an image displayed on a display in the fifth embodiment of the present invention.

FIG. 25 shows an example of an image displayed on the display unit 5. The same 2D image G11 as that shown in FIG. 14 and the same image G12 as that shown in FIG. 14 are displayed on the display unit 5. The same cursor C11 as that shown in FIG. 15 is displayed on the 2D image G11. FIG. 25 shows a state after the feature region R11 is selected in Step S122.

A user moves the cursor C11 and designates a point on the 2D image G11. When a user tries to move the cursor C11 outside a region on the 2D image G11 corresponding to the feature region R11, the cursor calculation unit 184 determines that the position on the image G12 corresponding to the position of the cursor C11 is not in the feature region R11 in Step S132. Therefore, Step S108 is not executed. For example, a user cannot move the cursor C11 to a position on the 2D image G11 corresponding to a position in the feature region R12. On the other hand, a user can move the cursor C11 to a position on the 2D image G11 corresponding to a position in the feature region R11. For example, a user designates a point P31, and the point input unit 185 accepts the point P31. The point P31 corresponds to a point in the feature region R11. The measurement unit 187 uses the 3D coordinates of the point P31 for measurement.

Figure 26:
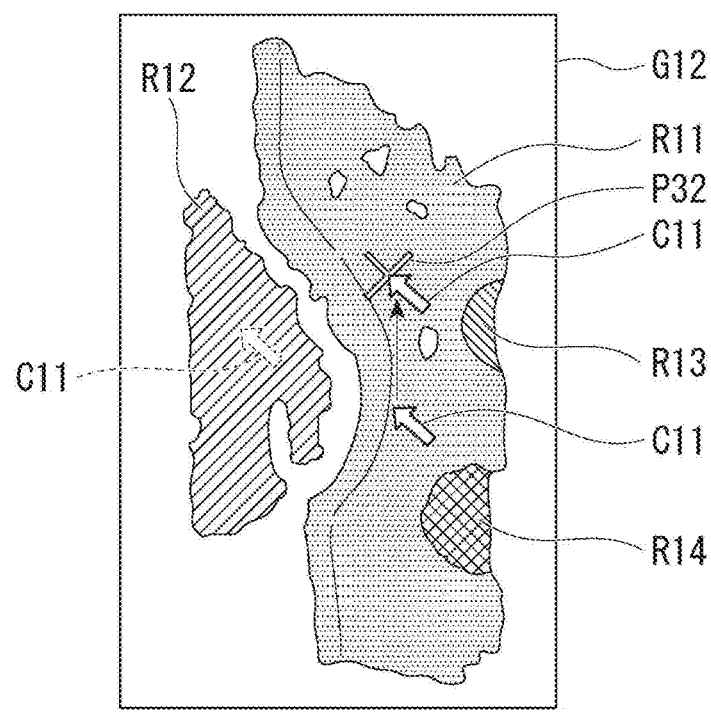
FIG. 26 is a diagram showing an example of an image displayed on the display in the fifth embodiment of the present invention.

FIG. 26 shows another example of an image displayed on the display unit 5. In the example shown in FIG. 26, the 2D image of the subject is not displayed in Step S104. The same image G12 as that shown in FIG. 14 is displayed on the display unit 5. The same cursor C11 as that shown in FIG. 15 is displayed on the image G12. When a position on the image G12 is accepted through the operation unit 4 in Step S131, the region selection unit 186 selects a feature region corresponding to the position in Step S122. FIG. 26 shows a state after the feature region R11 is selected in Step S122.

A user moves the cursor C11 and designates a point on the image G12. When a user tries to move the cursor C11 outside the feature region R11, the cursor calculation unit 184 determines that the position of the cursor C11 is not in the feature region R11 in Step S132. Therefore, Step S108 is not executed. For example, a user cannot move the cursor C11 to a position in the feature region R12. On the other hand, a user can move the cursor C11 to a position in the feature region R11. For example, a user designates a point P32, and the point input unit 185 accepts the point P32. The point P32 is in the feature region R11. The measurement unit 187 uses the 3D coordinates of the point P32 for measurement.

In the three-dimensional measurement shown in FIG. 24, when the point input unit 185 accepts a first point on the subject in Step S131, the region selection unit 186 selects a feature region including the first point as a selected region in Step S122. When the point input unit 185 accepts a second point in the selected region in Step S109, the measurement unit 187 measures the size of the subject on the basis of the 3D coordinates of two or more points including the first point and the second point in Step S111. The second point is different from the first point. In a case in which the point input unit 185 accepts three or more points, the three or more points include the first point and the second point described above. Since two or more points in the selected region are used for measurement, the endoscope device 1 can avoid using a point that is not intended by a user.

In the example shown in FIG. 25, the 2D image of the subject and the image of the feature regions are displayed on the display unit 5, and the 2D image is used for inputting a point. In the example shown in FIG. 26, the image of the feature regions is displayed on the display unit 5, and the image is used for inputting a point. A combination of an image displayed on the display unit 5 and an image used for inputting a point is not limited to these examples. The combination is similar to that in the third embodiment. In the fifth embodiment, the image of the feature regions does not need to be displayed.

In the three-dimensional measurement shown in FIG. 24, the measurement unit 187 uses the point accepted in Step S131 for measurement. The point may be used only for selecting a feature region. The measurement unit 187 does not need to use the point for measurement.

The display control unit 183 may highlight the selected region in Step S122. Alternatively, the display control unit 183 may display only the selected region on the display unit 5 in Step S122.

The order of processing in the three-dimensional measurement is not limited to that shown in FIG. 24. For example, the 2D image of the subject may be displayed on the display unit 5 before Step S101, Step S102, or Step S103 is executed. In a case in which the 3D image of the point-cloud data is used instead of the 2D image of the subject, the 3D image may be displayed on the display unit 5 before Step S102 or Step S103 is executed.

In the fifth embodiment, the endoscope device 1 executes the second control. In the second control, a mark is displayed on an image, and the position of the mark is restricted to a position in a region corresponding to the selected region. The endoscope device 1 uses the 3D coordinates of the point in the selected region for measurement. Therefore, the endoscope device 1 can support correct designation of a point on the subject. A user can easily designate a point on the border of the selected region.

Sixth Embodiment

A sixth embodiment of the present invention will be described. The endoscope device 1 according to the sixth embodiment includes the CPU 18a shown in FIG. 20. In the sixth embodiment, in a case in which a point outside a feature region is accepted, the point is changed to a point in the feature region.

The information control unit 188 executes the first control. The information control unit 188 controls the point information generated by the point input unit 185 so that the point information indicates a point in one of the one or more feature regions.

The region selection unit 186 selects one of the one or more feature regions detected by the region detection unit 182 as a selected region (region selection step). When the region detection unit 182 detects two or more feature regions, the region selection unit 186 selects one of the two or more feature regions as a selected region. When the region detection unit 182 detects only one feature region, the region selection unit 186 selects the feature region. When the point input unit 185 accepts a point outside the selected region, the information control unit 188 invalidates the point information indicating the point. Furthermore, the information control unit 188 generates new point information indicating a point in the selected region (information control step). The measurement unit 187 measures the size of the subject on the basis of the 3D coordinates of two or more points indicated by the point information other than the invalid point information (measurement step).

The measurement unit 187 does not use the 3D coordinates of one or more points indicated by the invalid point information for measurement. The measurement unit 187 uses the 3D coordinates of one or more points indicated by the point information that is not invalid for measurement. The point information of some of the two or more points used by the measurement unit 187 does not need to be a target in the above-described processing. For example, in a case in which the plane-based measurement is executed, the point information of three reference points defining a reference plane may be a target in the above-described processing, and the point information of one measurement point does not need to be a target in the above-described processing.

The region selection unit 186 may select one of the two or more feature regions detected by the region detection unit 182 as a first selected region and may select one of the one or more feature regions other than the first selected region as a second selected region. Only when the point input unit 185 accepts a point in a region other than the first selected region and the second selected region, the information control unit 188 may invalidate the point information indicating the point. For example, in a case in which the plane-based measurement is executed, the point input unit 185 may accept three reference points in the first selected region and may accept one measurement point in the second selected region.

Figure 27:
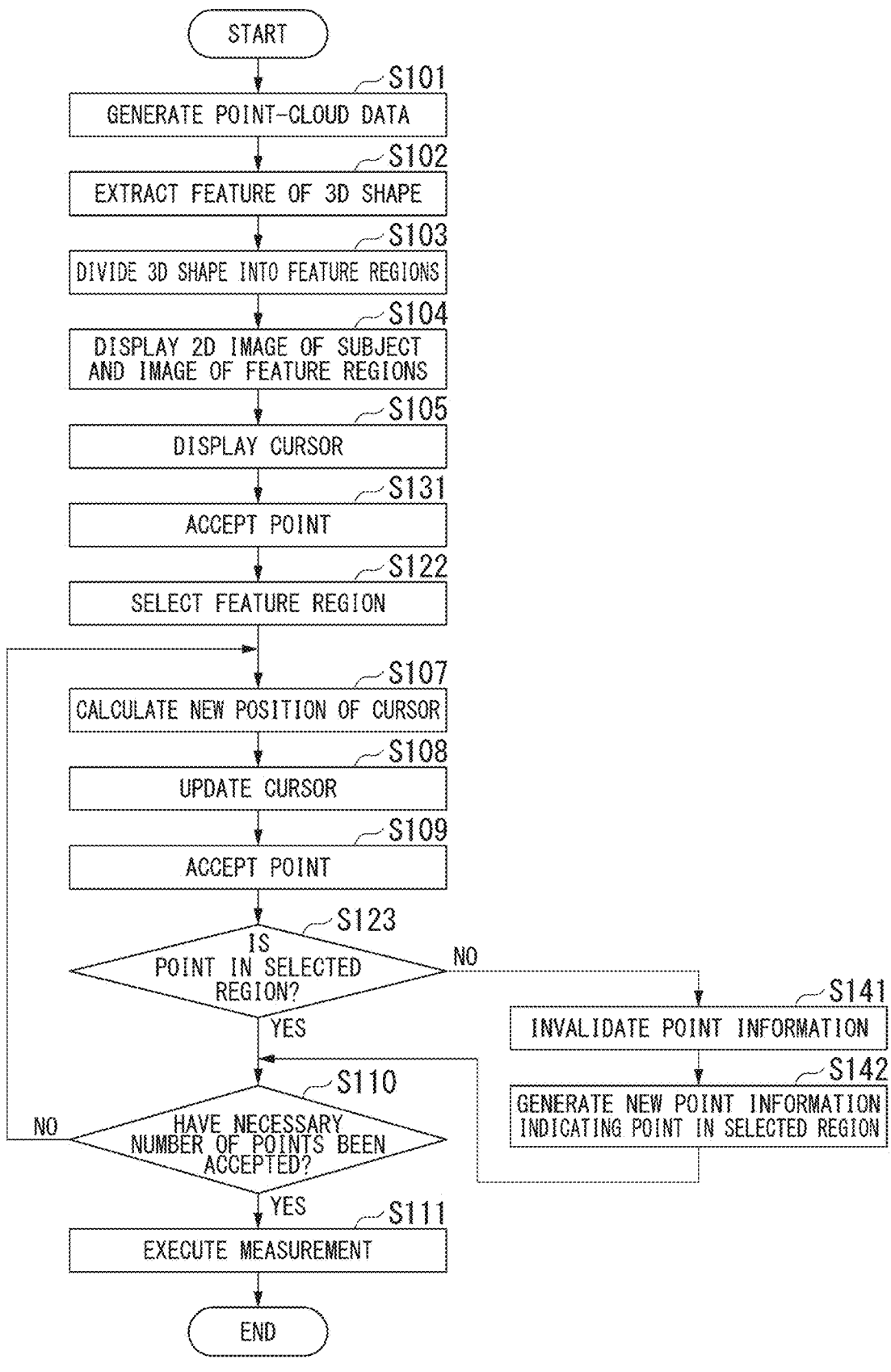
FIG. 27 is a flow chart showing a procedure of three-dimensional measurement in a sixth embodiment of the present invention.

Three-dimensional measurement in the sixth embodiment will be described by using FIG. 27. FIG. 27 shows a procedure of the three-dimensional measurement. The same processing as that shown in FIG. 13, FIG. 21, and FIG. 24 will not be described.

The display control unit 183 displays the 2D image of the subject and the image of the feature regions on the display unit 5 in Step S104. The point input unit 185 accepts a point on the 2D image of the subject in Step S131. The region selection unit 186 selects one feature region as a selected region in Step S122.

The point input unit 185 accepts a point on the 2D image of the subject in Step S109. The information control unit 188 calculates a position on the image of the feature regions corresponding to the point in Step S123. The information control unit 188 determines whether or not the calculated position is in the selected region in Step S123.

When the information control unit 188 determines that the position is not in the selected region in Step S123, the information control unit 188 invalidates the point information of the point (Step S141). Step S141 corresponds to the information control step.

For example, the information control unit 188 generates information indicating that the point information is invalid and adds the generated information to the point information. The information control unit 188 may manage a table including the point information and the information indicating that the point information is invalid. The invalid point information indicates that use of the point indicated by the point information for measurement is prohibited. The information control unit 188 may invalidate the point information by discarding the point information.

After Step S141, the information control unit 188 generates new point information indicating a point in the selected region (Step S142). Step S142 corresponds to the information control step.

The information control unit 188 calculates a position in the selected region on the basis of the position calculated in Step S123. For example, the information control unit 188 calculates the closest position to that calculated in Step S123. The information control unit 188 generates point information indicating the position. The information control unit 188 may calculate a position of a new point on the basis of the distance between the position calculated in Step S123 and a position in the selected region, the brightness at a position in the selected region, the contrast at a position in the selected region, a correlation value obtained in matching processing, and the like. After Step S142, Step S110 is executed.

The measurement unit 187 measures the size of the subject on the basis of the 3D coordinates of only a point indicated by the point information that is not invalid in Step S111. The point indicated by the point information that is not invalid is in the selected region. Since the point in the selected region is used for measurement, the endoscope device 1 can avoid using a point that is not intended by a user.

Figure 28:
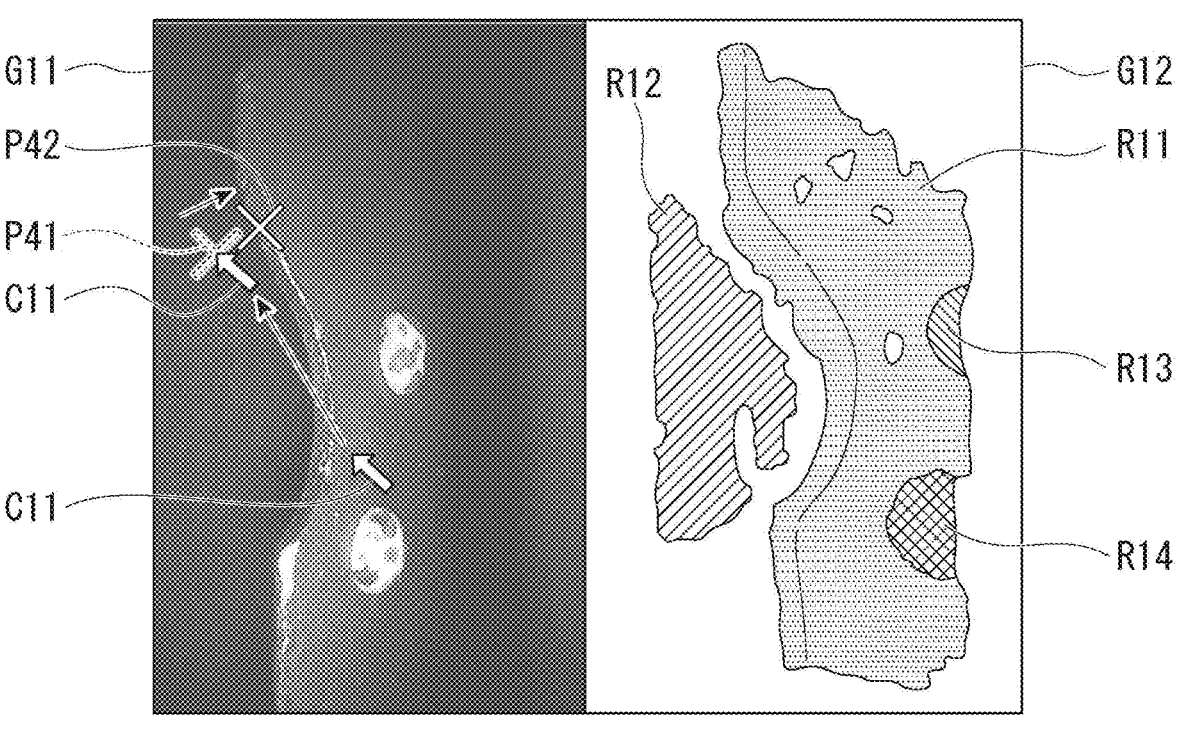
FIG. 28 is a diagram showing an example of an image displayed on a display in the sixth embodiment of the present invention.

FIG. 28 shows an example of an image displayed on the display unit 5. The same 2D image G11 as that shown in FIG. 14 and the same image G12 as that shown in FIG. 14 are displayed on the display unit 5. The same cursor C11 as that shown in FIG. 15 is displayed on the 2D image G11. FIG. 28 shows a state after the feature region R11 is selected in Step S122.

A user moves the cursor C11 and designates a point on the 2D image G11. For example, a user designates a point P41, and the point input unit 185 accepts the point P41. The point P41 corresponds to a point in the feature region R12. The information control unit 188 determines that a point on the image G12 corresponding to the point P41 is not in the feature region R11 in Step S123. Therefore, the information control unit 188 invalidates the point information of the point P41 in Step S141. Furthermore, the information control unit 188 generates new point information indicating a point P42 in a region corresponding to the feature region R11 in Step S142. At this time, a mark of the point P42 may be displayed without displaying a mark of the point P41. In the example shown in FIG. 28, the point P42 is the closest to the point P41 among points in the region corresponding to the feature region R11. The measurement unit 187 uses the 3D coordinates of the point P42 for measurement without using the 3D coordinates of the point P41 for measurement.

Figure 29:
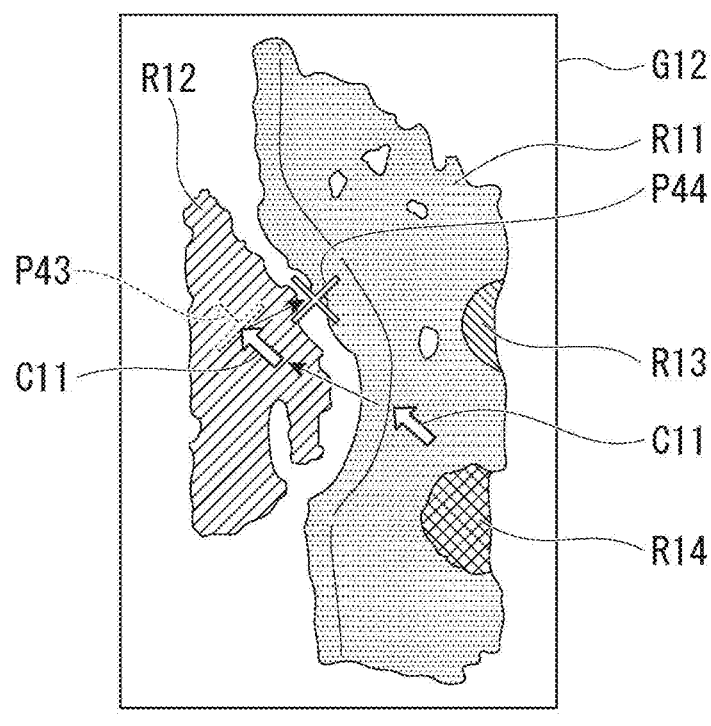
FIG. 29 is a diagram showing an example of an image displayed on the display in the sixth embodiment of the present invention.

FIG. 29 shows another example of an image displayed on the display unit 5. In the example shown in FIG. 29, the 2D image of the subject is not displayed in Step S104. The same image G12 as that shown in FIG. 14 is displayed on the display unit 5. The same cursor C11 as that shown in FIG. 15 is displayed on the image G12. When a position on the image G12 is accepted through the operation unit 4 in Step S131, the region selection unit 186 selects a feature region corresponding to the position in Step S122. FIG. 29 shows a state after the feature region R11 is selected in Step S122.

A user moves the cursor C11 and designates a point on the image G12. For example, a user designates a point P43, and the point input unit 185 accepts the point P43. The point P43 is in the feature region R12. The information control unit 188 determines that the point P43 is not in the feature region R11 in Step S123. Therefore, the information control unit 188 invalidates the point information of the point P43 in Step S141. Furthermore, the information control unit 188 generates new point information indicating a point P44 in the feature region R11 in Step S142. At this time, a mark of the point P44 may be displayed without displaying a mark of the point P43. In the example shown in FIG. 29, the point P44 is the closest to the point P43 among points in the feature region R11. The measurement unit 187 uses the 3D coordinates of the point P44 for measurement without using the 3D coordinates of the point P43 for measurement.

There is a case in which the point input unit 185 accepts a point in a region (background) that is not any of the feature region R11, the feature region R12, the feature region R13, and the feature region R14. In such a case, the information control unit 188 determines that the point is not in the feature region R11 in Step S123. Therefore, the point information of the point is invalid, and the measurement unit 187 does not use the 3D coordinates of the point for measurement.

In the three-dimensional measurement shown in FIG. 27, when the point input unit 185 accepts a first point on the subject in Step S131, the region selection unit 186 selects a feature region including the first point as a selected region in Step S122. When the point input unit 185 accepts a second point in the selected region in Step S109, the measurement unit 187 measures the size of the subject on the basis of the 3D coordinates of two or more points including the first point and the second point in Step S111. The second point is different from the first point. In a case in which the point input unit 185 accepts three or more points, the three or more points include the first point and the second point described above. Since two or more points in the selected region are used for measurement, the endoscope device 1 can avoid using a point that is not intended by a user.

In the example shown in FIG. 28, the 2D image of the subject and the image of the feature regions are displayed on the display unit 5, and the 2D image is used for inputting a point. In the example shown in FIG. 29, the image of the feature regions is displayed on the display unit 5, and the image is used for inputting a point. A combination of an image displayed on the display unit 5 and an image used for inputting a point is not limited to these examples. The combination is similar to that in the third embodiment. In the sixth embodiment, the image of the feature regions does not need to be displayed.

In the three-dimensional measurement shown in FIG. 27, the measurement unit 187 uses the point accepted in Step S131 for measurement. The point may be used only for selecting a feature region. The measurement unit 187 does not need to use the point for measurement.

The display control unit 183 may highlight the selected region in Step S122. Alternatively, the display control unit 183 may display only the selected region on the display unit 5 in Step S122.

In a case in which the display unit 5 and the operation unit 4 are constituted as a touch panel, the cursor does not need to be displayed. Accordingly, Step S105, Step S107, and Step S108 do not need to be executed. The CPU 18 does not need to have the function of the cursor calculation unit 184.

The order of processing in the three-dimensional measurement is not limited to that shown in FIG. 27. For example, the 2D image of the subject may be displayed on the display unit 5 before Step S101, Step S102, or Step S103 is executed. In a case in which the 3D image of the point-cloud data is used instead of the 2D image of the subject, the 3D image may be displayed on the display unit 5 before Step S102 or Step S103 is executed.

In the sixth embodiment, the endoscope device 1 executes the first control. In the first control, the point information is controlled so that the point information indicates a point in the selected region. The endoscope device 1 uses the 3D coordinates of the point in the selected region for measurement. Therefore, the endoscope device 1 can support correct designation of a point on the subject. A user can easily designate a point on the border of the selected region.

Seventh Embodiment

A seventh embodiment of the present invention will be described. The endoscope device 1 according to the seventh embodiment includes the CPU 18a shown in FIG. 20. In the seventh embodiment, in a case in which a mark on an image is outside one feature region and a point at the position of the mark is accepted, the position of the mark is changed to a position in the feature region.

The display control unit 183 and the cursor calculation unit 184 execute the second control. The display control unit 183 displays a mark on an image. The cursor calculation unit 184 restricts the position of the mark to a position in a region corresponding to one of one or more feature regions.

The display control unit 183 displays one of the 3D image of the point-cloud data and the 2D image of the subject on the display unit 5 (image display step). The region selection unit 186 selects one of the one or more feature regions detected by the region detection unit 182 as a selected region (region selection step). In a case in which the region detection unit 182 detects two or more feature regions, the region selection unit 186 selects one of the two or more feature regions as a selected region. In a case in which the region detection unit 182 detects only one feature region, the region selection unit 186 selects the feature region. The display control unit 183 displays a mark on one of the 3D image of the point-cloud data and the 2D image of the subject (mark display step). The cursor calculation unit 184 calculates a position at which the mark is displayed on the basis of the information accepted through the operation unit 4 (position calculation step).

When the mark is displayed in a region corresponding to the selected region and the point input unit 185 accepts a point corresponding to the position of the mark, the measurement unit 187 calculates the size of the subject on the basis of the 3D coordinates of two or more points including the point indicated by the point information (measurement step). When the mark is displayed outside the region corresponding to the selected region and the point input unit 185 accepts a point corresponding to the position of the mark, the mark is displayed in the region corresponding to the selected region.

The display control unit 183 may display the mark on the image of the one or more feature regions (mark display step). When the mark is displayed in the selected region and the point input unit 185 accepts a point corresponding to the position of the mark, the measurement unit 187 may measure the size of the subject on the basis of the 3D coordinates of two or more points including the point indicated by the point information (measurement step). When the mark is displayed outside the selected region and the point input unit 185 accepts a point corresponding to the position of the mark, the mark may be displayed in the selected region. In a case in which the mark is displayed on the image of the feature regions, the display control unit 183 does not need to display the 3D image of the point-cloud data and the 2D image of the subject on the display unit 5.

The region selection unit 186 may select one of the two or more feature regions detected by the region detection unit 182 as a first selected region and may select one of the one or more feature regions other than the first selected region as a second selected region. The position at which the mark is displayed may be restricted to a position in a region corresponding to the first selected region or the second selected region. For example, in a case in which the plane-based measurement is executed, the position of the mark may be restricted to a position in a region corresponding to the first selected region and the point input unit 185 may accept three reference points in the first selected region. Thereafter, the position of the mark may be restricted to a position in a region corresponding to the second selected region and the point input unit 185 may accept one measurement point in the second selected region.

Figure 30:
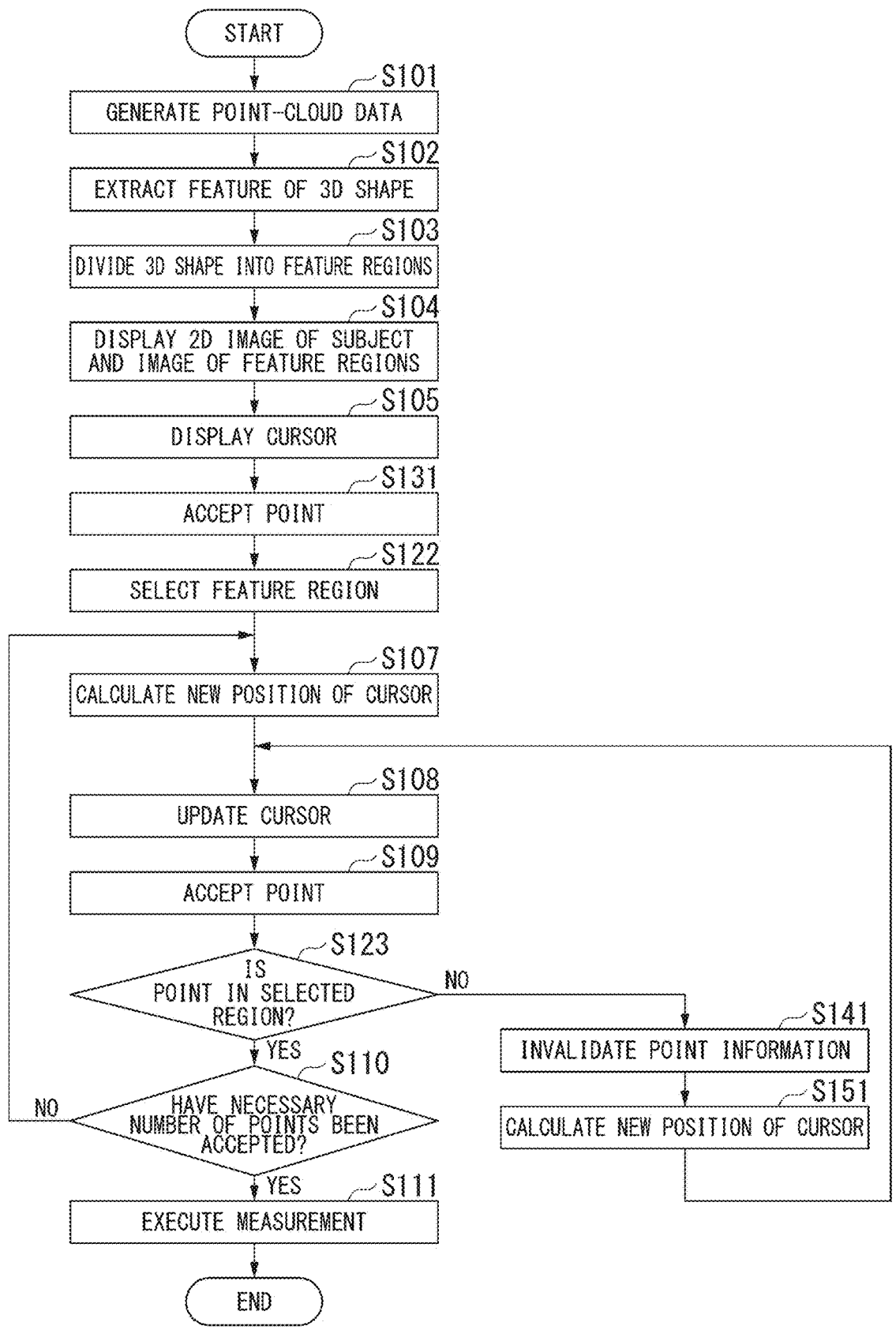
FIG. 30 is a flow chart showing a procedure of three-dimensional measurement in a seventh embodiment of the present invention.

Three-dimensional measurement in the seventh embodiment will be described by using FIG. 30. FIG. 30 shows a procedure of the three-dimensional measurement. The same processing as that shown in FIG. 13, FIG. 21, FIG. 24, and FIG. 27 will not be described.

The display control unit 183 displays the 2D image of the subject and the image of the feature regions on the display unit 5 in Step S104. The point input unit 185 accepts a point on the 2D image of the subject in Step S131. The region selection unit 186 selects one feature region as a selected region in Step S122.

The point input unit 185 accepts a point on the 2D image of the subject in Step S109. The information control unit 188 calculates a position on the image of the feature regions corresponding to the point in Step S123. The information control unit 188 determines whether or not the calculated position is in the selected region in Step S123.

When the information control unit 188 determines that the position is not in the selected region in Step S123, the information control unit 188 invalidates the point information of the point in Step S141.

After Step S141, the cursor calculation unit 184 calculates a new position of the cursor on the 2D image of the subject (Step S151). Step S151 corresponds to the position calculation step.

The cursor calculation unit 184 calculates a position in the selected region on the basis of the position calculated in Step S123. For example, the cursor calculation unit 184 calculates the closest position to that calculated in Step S123. The cursor calculation unit 184 may calculate a new position of the cursor on the basis of the distance between the position calculated in Step S123 and a position in the selected region, the brightness at a position in the selected region, the contrast at a position in the selected region, a correlation value obtained in matching processing, and the like. After Step S151, Step S108 is executed.

The display control unit 183 displays the cursor at the position calculated by the cursor calculation unit 184 in Step S108, thus updating the cursor. When Step S108 is executed, the cursor moves from a position outside a region of the 2D image corresponding to the selected region to a position in the region of the 2D image corresponding to the selected region.

The measurement unit 187 measures the size of the subject on the basis of the 3D coordinates of only a point indicated by the point information that is not invalid in Step S111. The point indicated by the point information that is not invalid is in the selected region. Since the point in the selected region is used for measurement, the endoscope device 1 can avoid using a point that is not intended by a user.

Figure 31:
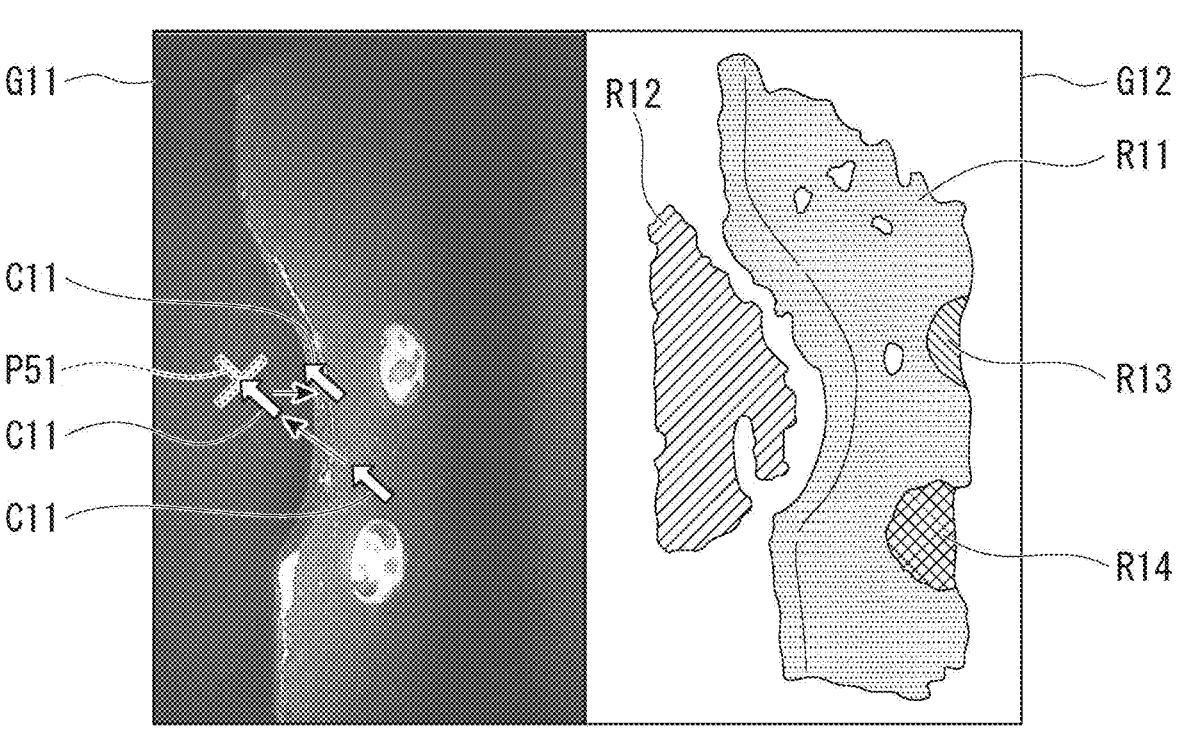
FIG. 31 is a diagram showing an example of an image displayed on a display in the seventh embodiment of the present invention.

FIG. 31 shows an example of an image displayed on the display unit 5. The same 2D image G11 as that shown in FIG. 14 and the same image G12 as that shown in FIG. 14 are displayed on the display unit 5. The same cursor C11 as that shown in FIG. 15 is displayed on the 2D image G11. FIG. 31 shows a state after the feature region R11 is selected in Step S122.

A user moves the cursor C11 and designates a point on the 2D image G11. For example, a user designates a point P51, and the point input unit 185 accepts the point P51. The point P51 corresponds to a point in the feature region R12. The information control unit 188 determines that a point on the image G12 corresponding to the point P51 is not in the feature region R11 in Step S123. Therefore, the information control unit 188 invalidates the point information of the point P51 in Step S141. The cursor calculation unit 184 calculates a new position of the cursor C11 in Step S151. The position is in a region corresponding to the feature region R11. The display control unit 183 displays the cursor C11 at the position in Step S151. The measurement unit 187 does not use the 3D coordinates of the point P51 for measurement.

Figure 32:
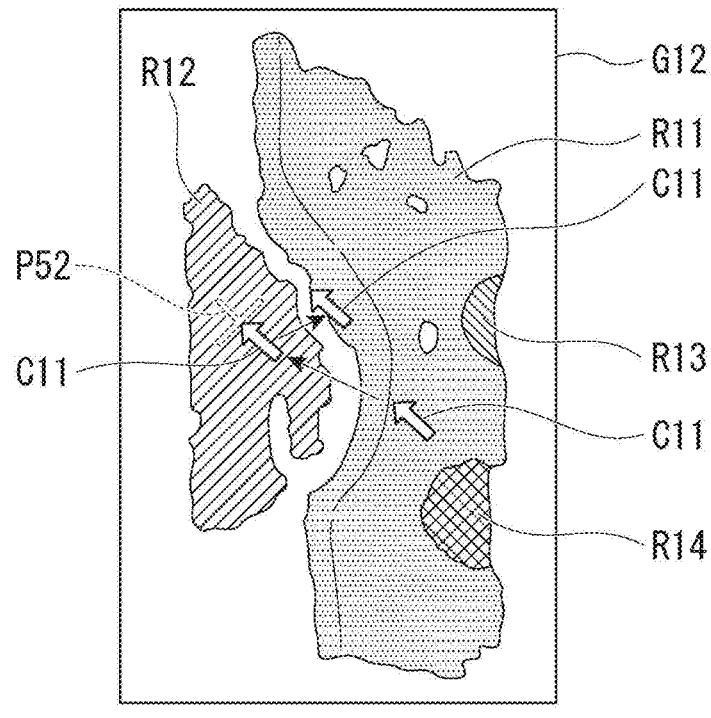
FIG. 32 is a diagram showing an example of an image displayed on the display in the seventh embodiment of the present invention.

FIG. 32 shows another example of an image displayed on the display unit 5. In the example shown in FIG. 32, the 2D image of the subject is not displayed in Step S104. The same image G12 as that shown in FIG. 14 is displayed on the display unit 5. The same cursor C11 as that shown in FIG. 15 is displayed on the image G12. When a position on the image G12 is accepted through the operation unit 4 in Step S131, the region selection unit 186 selects a feature region corresponding to the position in Step S122. FIG. 32 shows a state after the feature region R11 is selected in Step S122.

A user moves the cursor C11 and designates a point on the image G12. For example, a user designates a point P52, and the point input unit 185 accepts the point P52. The point P52 is in the feature region R12. The information control unit 188 determines that the point P52 is not in the feature region R11 in Step S123. Therefore, the information control unit 188 invalidates the point information of the point P52 in Step S141. The cursor calculation unit 184 calculates a new position of the cursor C11 in Step S151. The position is in the feature region R11. The display control unit 183 displays the cursor C11 at the position in Step S108. The measurement unit 187 does not use the 3D coordinates of the point P52 for measurement.

There is a case in which the point input unit 185 accepts a point in a region (background) that is not any of the feature region R11, the feature region R12, the feature region R13, and the feature region R14. In such a case, the information control unit 188 determines that the point is not in the feature region R11 in Step S123. Therefore, the point information of the point is invalid, and the measurement unit 187 does not use the 3D coordinates of the point for measurement.

In the three-dimensional measurement shown in FIG. 30, when the point input unit 185 accepts a first point on the subject in Step S131, the region selection unit 186 selects a feature region including the first point as a selected region in Step S122. When the point input unit 185 accepts a second point in the selected region in Step S109, the measurement unit 187 measures the size of the subject on the basis of the 3D coordinates of two or more points including the first point and the second point in Step S111. The second point is different from the first point. In a case in which the point input unit 185 accepts three or more points, the three or more points include the first point and the second point described above. Since two or more points in the selected region are used for measurement, the endoscope device 1 can avoid using a point that is not intended by a user.

In the example shown in FIG. 31, the 2D image of the subject and the image of the feature regions are displayed on the display unit 5, and the 2D image is used for inputting a point. In the example shown in FIG. 32, the image of the feature regions is displayed on the display unit 5, and the image is used for inputting a point. A combination of an image displayed on the display unit 5 and an image used for inputting a point is not limited to these examples. The combination is similar to that in the third embodiment. In the seventh embodiment, the image of the feature regions does not need to be displayed.

In the three-dimensional measurement shown in FIG. 30, the measurement unit 187 uses the point accepted in Step S131 for measurement. The point may be used only for selecting a feature region. The measurement unit 187 does not need to use the point for measurement.

The display control unit 183 may highlight the selected region in Step S122. Alternatively, the display control unit 183 may display only the selected region on the display unit 5 in Step S122.

The order of processing in the three-dimensional measurement is not limited to that shown in FIG. 30. For example, the 2D image of the subject may be displayed on the display unit 5 before Step S101, Step S102, or Step S103 is executed. In a case in which the 3D image of the point-cloud data is used instead of the 2D image of the subject, the 3D image may be displayed on the display unit 5 before Step S102 or Step S103 is executed.

In the seventh embodiment, the endoscope device 1 executes the second control. In the second control, a mark is displayed on an image, and the position of the mark is restricted to a position in a region corresponding to the selected region. The endoscope device 1 uses the 3D coordinates of the point in the selected region for measurement. Therefore, the endoscope device 1 can support correct designation of a point on the subject. A user can easily designate a point on the border of the selected region.

Eighth Embodiment

An eighth embodiment of the present invention will be described. Hereinafter, an example in which the PC 41 shown in FIG. 11 is a measurement device is described. The PC 41 acquires the 2D image of the subject from the endoscope device 1 and executes three-dimensional measurement.

The external device interface 16 of the endoscope device 1 performs communication with the PC 41. Specifically, the external device interface 16 transmits one or more 2D images of the subject to the PC 41. The PC 41 receives the 2D images from the endoscope device 1.

For example, the external device interface 16 is connected to the PC 41 wirelessly or by a cable. The communication between the external device interface 16 and the PC 41 may be performed via a local area network (LAN) or the Internet.

Figure 33:
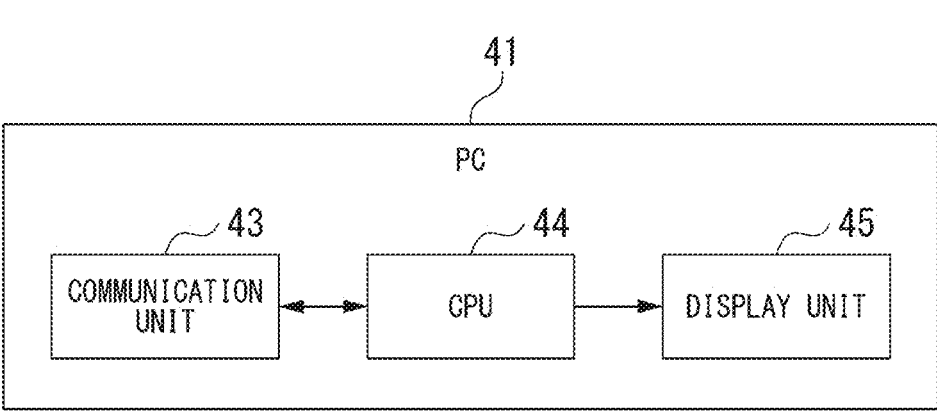
FIG. 33 is a block diagram showing a configuration of a personal computer according to an eighth embodiment of the present invention.

FIG. 33 shows a configuration of the PC 41. The PC 41 shown in FIG. 33 includes a communication unit 43, a CPU 44, and a display unit 45.

The communication unit 43 performs communication with the external device interface 16 of the endoscope device 1. Specifically, the communication unit 43 receives one or more 2D images of a subject from the external device interface 16. The CPU 44 executes processing for three-dimensional measurement. The display unit 45 is a monitor (display) such as an LCD. The display unit 45 includes a display screen and displays an image, an operation menu, and the like on the display screen.

Figure 34:
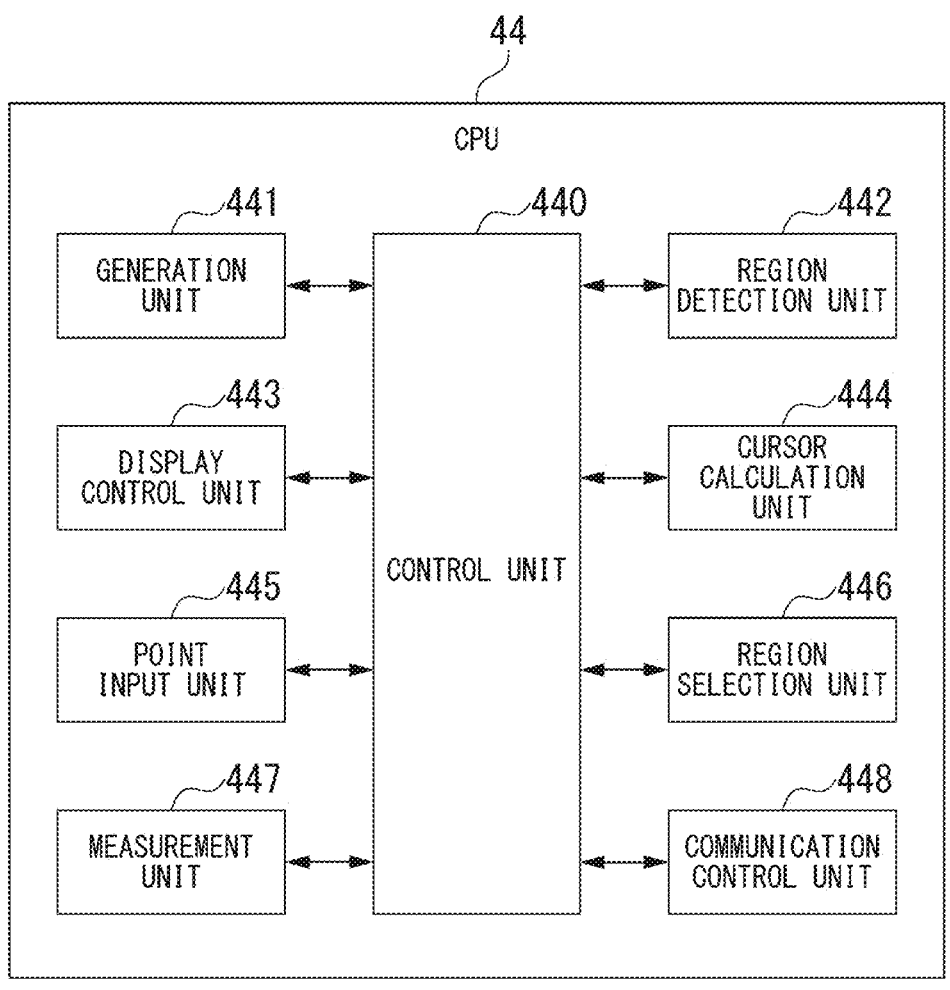
FIG. 34 is a block diagram showing a functional configuration of a CPU included in the personal computer according to the eighth embodiment of the present invention.

FIG. 34 shows a functional configuration of the CPU 44. The CPU 44 has functional units including a control unit 440, a generation unit 441, a region detection unit 442, a display control unit 443, a cursor calculation unit 444, a point input unit 445, a region selection unit 446, a measurement unit 447, and a communication control unit 448. At least one of the blocks shown in FIG. 34 may be constituted by a different circuit from the CPU 44.

Each unit shown in FIG. 34 may be constituted by at least one of a processor and a logic circuit. Each unit shown in FIG. 34 may include one or a plurality of processors. Each unit shown in FIG. 34 may include one or a plurality of logic circuits.

The control unit 440 controls processing executed by each unit. The generation unit 441 has the same function as that of the generation unit 181 shown in FIG. 12. The region detection unit 442 has the same function as that of the region detection unit 182 shown in FIG. 12. The display control unit 443 has the same function as that of the display control unit 183 shown in FIG. 12. The cursor calculation unit 444 has the same function as that of the cursor calculation unit 184 shown in FIG. 12. The point input unit 445 has the same function as that of the point input unit 185 shown in FIG. 12. The region selection unit 446 has the same function as that of the region selection unit 186 shown in FIG. 12. The measurement unit 447 has the same function as that of the measurement unit 187 shown in FIG. 12. The communication control unit 448 performs communication with the external device interface 16 of the endoscope device 1 by controlling the communication unit 43.

The CPU 44 executes three-dimensional measurement shown in FIG. 13 or FIG. 24. The CPU 44 may have the function of the information control unit 188 shown in FIG. 20. In a case in which the CPU 44 has the function of the information control unit 188, the CPU 44 may execute three-dimensional measurement shown in FIG. 21, FIG. 27, or FIG. 30.

The CPU 44 may read a program including commands defining the operations of the CPU 44 and may execute the read program. In other words, the function of the CPU 44 may be realized by software.

The endoscope device 1 may generate point-cloud data on the basis of a 2D image of a subject, and the external device interface 16 of the endoscope device 1 may transmit the 2D image and the point-cloud data to the PC 41. The communication unit 43 of the PC 41 may receive the 2D image and the point-cloud data from the external device interface 16. Therefore, the CPU 44 does not need to include the generation unit 181.

In the eighth embodiment, the PC 41 can support correct designation of a point on the subject.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A measurement method executed by one or more processors, the measurement method comprising:
calculating three-dimensional coordinates of two or more points on a subject having a three-dimensional shape on the basis of a two-dimensional image of the subject, wherein the subject includes a surface defining a normal line having a direction perpendicular to the surface;
generating three-dimensional image data including the three-dimensional coordinates of the two or more points;
extracting, on the basis of the three-dimensional coordinates of the two or more points, shape features including a first shape feature in the three-dimensional shape of the subject and a second shape feature different from the first shape feature in the three-dimensional shape of the subject, the shape features being extracted on the basis of three-dimensional distances between the three-dimensional coordinates of the two or more points and a change in a direction of the normal line on the surface of a three-dimensional shape formed by the three-dimensional coordinates of the two or more points on the subject having the three-dimensional shape;
detecting a first feature region on the three-dimensional shape of the subject having the first shape feature and a second feature region on the three-dimensional shape of the subject having the second shape feature;
assigning each of the two or more points to one of the first feature region or the second feature region on the basis of the shape features;
controlling a display to display an image of the first feature region and the second feature region so that the first feature region and the second feature region are visually distinguished from each other;
selecting one of the first feature region and the second feature region as a selected region;
accepting a point on the subject through an input device after displaying the image of the first feature region and the second feature region;
generating point information indicating the accepted point;
invalidating the accepted point information when a point outside the selected region is accepted as the point on the subject accepted through the input device;
generating new point information indicating a point in the selected region; and
measuring a size of the subject on the basis of three-dimensional coordinates of at least two points of the two or more points on the subject including the new point in the selected region and other than the invalid point information.

2. The measurement method according to claim 1, further comprising:

selecting one of the first feature region and the second feature region as a selected region; and validating the point information only when a point in the selected region is accepted as the point on the subject, wherein the size of the subject is measured on the basis of the three-dimensional coordinates of the two or more points including the point indicated by the valid point information.

3. The measurement method according to claim 2, wherein a feature region that is included in the first feature region and the second feature region and includes a first point on the subject is selected as the selected region when the first point is accepted as the point on the subject, wherein the size of the subject is measured on the basis of the three-dimensional coordinates of the two or more points including the first point and a second point in the selected region when the second point is accepted as the point on the subject, and wherein the second point is different from the first point.

4. The measurement method according to claim 2, wherein, when a position on the image of the first feature region and the second feature region is accepted through the input device, a feature region that is included in the first feature region and the second feature region and corresponds to the accepted position is selected as the selected region.

5. The measurement method according to claim 1, further comprising:

controlling the display to display one of an image of the three-dimensional image data and the two-dimensional image with the image of the first feature region and the second feature region;

selecting one of the first feature region and the second feature region as a selected region;

controlling the display to display a mark on one of the image of the three-dimensional image data and the two-dimensional image; and calculating a position at which the mark is displayed on the basis of information accepted through the input device, wherein the position at which the mark is displayed is restricted to a position in a region corresponding to the selected region, and wherein a point corresponding to the position of the mark is the point on the subject accepted through the input device.

6. The measurement method according to claim 1, further comprising:

selecting one of the first feature region and the second feature region as a selected region, controlling the display to display a mark on the image of the first feature region and the second feature region; and calculating a position at which the mark is displayed on the basis of information accepted through the input device, wherein the position at which the mark is displayed is restricted to a position in the selected region, and wherein a point corresponding to the position of the mark is accepted as the point on the subject accepted through the input device.

7. The measurement method according to claim 1, further comprising:

controlling the display to display one of an image of the three-dimensional image data and the two-dimensional image with the image of the first feature region and the second feature region;

selecting one of the first feature region and the second feature region as a selected region;

controlling the display to display a mark on one of the image of the three-dimensional image data and the two-dimensional image; and calculating a position at which the mark is displayed on the basis of information accepted through the input device, wherein the size of the subject is measured on the basis of the three-dimensional coordinates of the two or more points including the point indicated by the point information when the mark is displayed in a region corresponding to the selected region and the point corresponding to the position of the mark is accepted as the point on the subject accepted through the input device, and wherein a position at which the mark is displayed is changed to a position in the region corresponding to the selected region when the mark is displayed outside the region corresponding to the selected region and the point corresponding to the position of the mark is accepted as the point on the subject accepted through the input device.

8. The measurement method according to claim 1, further comprising:

selecting one of the first feature region and the second feature region as a selected region;

controlling the display to display a mark on the image of the first region and the second feature region; and calculating a position at which the mark is displayed on the basis of information accepted through the input device, wherein the size of the subject is measured on the basis of the three-dimensional coordinates of the two or more points including the point indicated by the point information when the mark is displayed in the selected region and the point corresponding to the position of the mark is accepted, and wherein a position at which the mark is displayed is changed to a position in the selected region when the mark is displayed outside the selected region and the point corresponding to the position of the mark is accepted.

9. The measurement method according to claim 1, further comprising:

selecting one of the first feature region and the second feature region as a selected region, wherein the selected region is displayed in a first color and a feature region that is included in the first feature region and the second feature region and is different from the selected region is displayed in a second color different from the first color.

10. The measurement method according to claim 1, further comprising:

selecting one of the first feature region and the second feature region as a selected region, wherein only the selected region is displayed.

11. The measurement method according to claim 1, further comprising:

selecting one of the first feature region and the second feature region as a selected region, wherein the selected region is highlighted when displaying the selected region.

12. The measurement method according to claim 1, further comprising:

detecting at least one of an edge and a step on the surface of the subject on the basis of the three-dimensional coordinates of the two or more points and the change in the direction of the normal line on the surface of the subject, wherein extracting the shape features comprises extracting the shape features on the basis of the three-dimensional distances between the two or more points and the at least one of the edge and the step detected on the basis of the change in the direction of the normal line on the surface of the subject.

13. A measurement method executed by one or more processors, the measurement method comprising:

calculating three-dimensional coordinates of two or more points on a subject having a three-dimensional shape on the basis of a two-dimensional image of the subject, wherein the subject includes a surface defining a normal line having a direction perpendicular to the surface;

generating three-dimensional image data including the three-dimensional coordinates of the two or more points;

extracting, on the basis of the three-dimensional coordinates of the two or more points, a shape feature in the three-dimensional shape of the subject, the shape features being extracted on the basis of three-dimensional distances between the three-dimensional coordinates of the two or more points and a change in a direction of the normal line on the surface of a three-dimensional shape formed by the three-dimensional coordinates of the two or more points on the subject having the three-dimensional shape;

detecting a feature region on the three-dimensional shape of the subject having the shape feature;

assigning at least one of the two or more points to the feature region on the basis of the shape feature;

controlling a display to display one of an image of the three-dimensional image data, the two-dimensional image, and an image of the feature region;

selecting one of the first feature region and the second feature region as a selected region;

accepting a point on the subject through an input device after displaying the one of the image of the three-dimensional image data, the two-dimensional image, and the image of the feature region;

generating point information indicating the accepted point;

invalidating the generated point information when a point outside the selected region is accepted as the point on the subject accepted through the input device;

generating new point information indicating a new point in the selected region; and executing one of a first control and a second control, wherein the point information is controlled in the first control so that the point information indicates a position in the feature region or a position on an edge of the feature region, wherein a mark is displayed on one of the image of the three-dimensional image data, the two-dimensional image, and the image of the feature region in the second control, wherein a position of the mark is restricted to a position in a region corresponding to the feature region, and wherein the point corresponding to the position of the mark is accepted in the accepting the point on the subject through the input device; and measuring a size of the subject on the basis of three-dimensional coordinates of at least two points of the two or more points on the subject including the new point in the selected region and other than the invalid point information.

14. A measurement device comprising:

one or more processors configured to:

calculate three-dimensional coordinates of two or more points on a subject having a three-dimensional shape on the basis of a two-dimensional image of the subject, wherein the subject includes a surface defining a normal line having a direction perpendicular to the surface;

generate three-dimensional image data including the three-dimensional coordinates of the two or more points;

extract, on the basis of the three-dimensional coordinates of the two or more points, shape features including a first shape feature in the three-dimensional shape of the subject and a second shape feature different from the first shape feature in the three-dimensional shape of the subject, the shape features being extracted on the basis of three-dimensional distances between the three-dimensional coordinates of the two or more points and a change in a direction of the normal line on the surface of a three-dimensional shape formed by the three-dimensional coordinates of the two or more points on the subject having the three-dimensional shape;

detect a first feature region on the three-dimensional shape of the subject having the first shape feature and a second feature region on the three-dimensional shape of the subject having the second shape feature;

assign each of the two or more points to one of the first feature region or the second feature region on the basis of the shape features;

control a display to display an image of the first feature region and the second feature region so that the first feature region and the second feature region are visually distinguished from each other;

select one of the first feature region and the second feature region as a selected region;

accept a point on the subject through an input device after displaying the image of the first feature region and the second feature region;

generate point information indicating the accepted point; and invalidate the generated point information when a point outside the selected region is accepted as the point on the subject accepted through the input device;

generate new point information indicating a new point in the selected region; and measure a size of the subject on the basis of three-dimensional coordinates of at least two points of the two or more points on the subject including the new point in the selected region and other than the invalid point information.

15. A non-transitory computer-readable recording medium storing a program causing a computer to at least execute:

calculating three-dimensional coordinates of two or more points on a subject having a three-dimensional shape on the basis of a two-dimensional image of the subject, wherein the subject includes a surface defining a normal line having a direction perpendicular to the surface;

generating three-dimensional image data including the three-dimensional coordinates of the two or more points;

extracting, on the basis of the three-dimensional coordinates of the two or more points, shape features including a first shape feature in the three-dimensional shape of the subject and a second shape feature different from the first shape feature in the three-dimensional shape of the subject, the shape features being extracted on the basis of three-dimensional distances between the three-dimensional coordinates of the two or more points and a change in a direction of the normal line on the surface of a three-dimensional shape formed by the three-dimensional coordinates of the two or more points on the subject having the three-dimensional shape;

detecting a first feature region on the three-dimensional shape of the subject having the first shape feature on the subject and a second feature region on the three-dimensional shape of the subject having the second shape feature;

assigning each of the two or more points to one of the first feature region or the second feature region on the basis of the shape features;

controlling a display to display an image of the first feature region and the second feature region so that the first feature region and the second feature region are visually distinguished from each other;

selecting one of the first feature region and the second feature region as a selected region;

accepting a point on the subject through an input device after displaying the image of the first feature region and the second feature region;

generating point information indicating the accepted point;

invalidating the accepted point information when a point outside the selected region is accepted as the point on the subject accepted through the input device;

generating new point information indicating a point in the selected region; and measuring a size of the subject on the basis of three-dimensional coordinates of at least two points of the two or more points on the subject including the new point in the selected region and other then the invalid point information.

\* \* \* \* \*